United States Patent

Dardashti

[11] Patent Number: 5,908,121
[45] Date of Patent: Jun. 1, 1999

[54] ADJUSTABLE DISPLAY ASSEMBLY

[76] Inventor: Shahriar Dardashti, c/o Atlantic, Inc., P.O. Box 2399, 10240 Matern Pl., Santa Fe Springs, Calif. 90670

[21] Appl. No.: 08/733,115

[22] Filed: Oct. 16, 1996

Related U.S. Application Data

[63] Continuation-in-part of application No. 08/613,926, Mar. 11, 1996, Pat. No. 5,595,312.

[51] Int. Cl.⁶ .............................................. A47F 7/00
[52] U.S. Cl. ............................................... 211/188
[58] Field of Search .................................. 211/188, 41.12

[56] References Cited

U.S. PATENT DOCUMENTS

| | | |
|---|---|---|
| D. 51,055 | 7/1917 | Board . |
| D. 109,389 | 4/1938 | Beyrle . |
| D. 129,636 | 9/1941 | Dreyfuss . |
| D. 134,294 | 11/1942 | Papas . |
| D. 152,330 | 1/1949 | Dillon . |
| D. 193,258 | 7/1962 | McPhail . |
| D. 205,114 | 6/1966 | Brinley . |
| D. 233,294 | 10/1974 | Goulder . |
| D. 244,499 | 5/1977 | Parfitt . |
| D. 305,836 | 2/1990 | Maia . |
| D. 318,280 | 7/1991 | Sumrell et al. . |
| D. 321,296 | 11/1991 | Miranda . |
| D. 325,137 | 4/1992 | Porter . |
| D. 339,485 | 9/1993 | James . |
| D. 357,160 | 4/1995 | Fritze . |

(List continued on next page.)

FOREIGN PATENT DOCUMENTS

| | | |
|---|---|---|
| 193201 | 9/1986 | European Pat. Off. . |
| 476729 | 3/1992 | European Pat. Off. . |
| 1144164 | 10/1957 | France . |
| 2217917 | 9/1974 | France . |
| 39111369 | 10/1990 | Germany . |
| 90 12 805 2 | 12/1990 | Germany . |
| 495730 | 9/1970 | Switzerland . |
| 168883 | 8/1991 | Taiwan . |
| 210175 | 7/1993 | Taiwan . |
| 211687 | 8/1993 | Taiwan . |

OTHER PUBLICATIONS

Salamander Designs "Archetype System" Advertisement—Copyright 1997 Salamander Designs Ltd.

*Primary Examiner*—Alvin C. Chin-Shue
*Assistant Examiner*—Sarah Purol
*Attorney, Agent, or Firm*—Oppenheimer Wolff & Donnelly LLP

[57] ABSTRACT

A storage and display tower assembly transported and distributed in a disassembled in a small box. The components thereof are easily and readily assembled to the configuration selected by the user to provide the desired appearance and use. The shelves, pinch clamps, weighted base and first and second sets of rods of the kit are removed from the box. The rods of the first set are threaded into upright securement to the base; a first shelf is slid through its openings along the rods; the lower ends of the second set of rods are threaded on top of the top ends of the respective rods of the first set with a stabilizing and article display shelf, if needed, sandwiched and fixed between them; and a second shelf is slid through its openings onto the rods of the second set. Using the support clamps, the first and second shelves are mounted at the desired heights to the first and second sets of rods, respectively. Decorative elements, structural plates and/or lamps can be attached at the top of the tower thereby defined. The sets of rods can consist of three or five rods. For the five rod embodiment the adjustable shelves can be large enough to have five openings to engage all five rods or can be smaller having only three openings each for side-by-side or staggered placement on three of the five rods. The shelves are adapted to store and display various media including video cassettes and compact disc cases as well as books, plants, knick-knacks and other articles in any number of desirable and convenient arrangements. The numbers, sizes and spacings of the shelves can be adjusted by the user from time to time to store and display different articles and/or to simply provide a different look.

87 Claims, 15 Drawing Sheets

U.S. PATENT DOCUMENTS

| | | |
|---|---|---|
| D. 357,331 | 4/1995 | Yeh . |
| D. 359,648 | 6/1995 | Hwang . |
| D. 360,276 | 7/1995 | Lundquist . |
| D. 360,329 | 7/1995 | Chu . |
| D. 363,626 | 10/1995 | Herbst . |
| D. 368,396 | 4/1996 | Bidwell . |
| D. 368,544 | 4/1996 | Perrillo . |
| D. 368,815 | 4/1996 | Keller et al. . |
| D. 370,330 | 5/1996 | Carpenter et al. . |
| 816,053 | 3/1906 | Wittbold . |
| 900,331 | 10/1908 | Weston . |
| 1,265,373 | 5/1918 | Phillip . |
| 2,143,592 | 1/1939 | Baldeck . |
| 3,477,584 | 11/1969 | Maslow et al. . |
| 3,684,285 | 8/1972 | Kane . |
| 3,730,601 | 5/1973 | Misenheimer, III . |
| 4,136,623 | 1/1979 | Dickson . |
| 4,351,244 | 9/1982 | Suttles . |
| 4,678,089 | 7/1987 | Lang . |
| 4,940,150 | 7/1990 | Spengler . |
| 5,048,429 | 9/1991 | Freiberg . |
| 5,195,642 | 3/1993 | Dardashti . |
| 5,314,077 | 5/1994 | Theosabrata . |
| 5,341,943 | 8/1994 | Fraser . |
| 5,358,124 | 10/1994 | Mueller . |
| 5,370,242 | 12/1994 | Huang . |
| 5,522,498 | 6/1996 | Chang . |
| 5,595,312 | 1/1997 | Dardashti . |

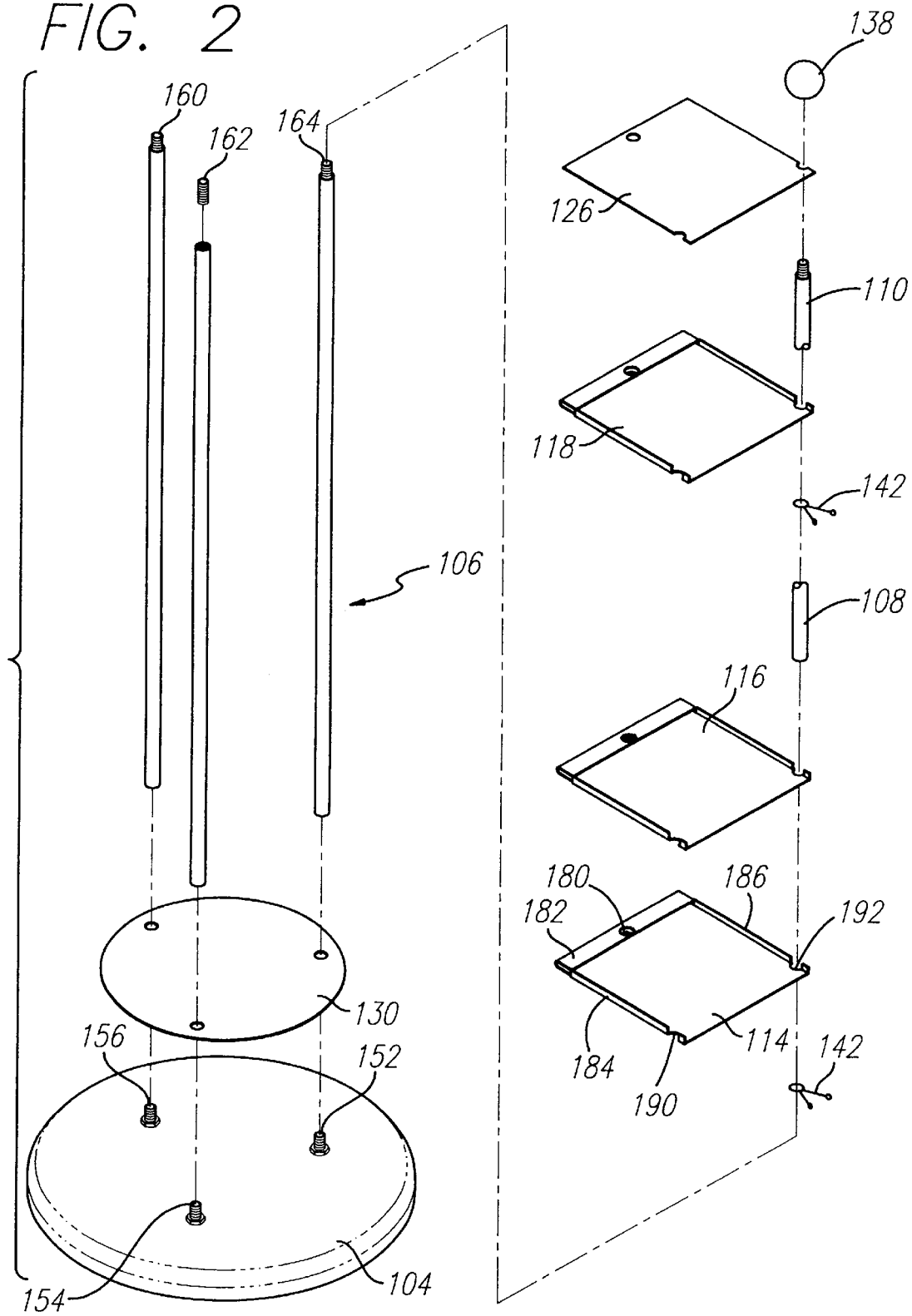

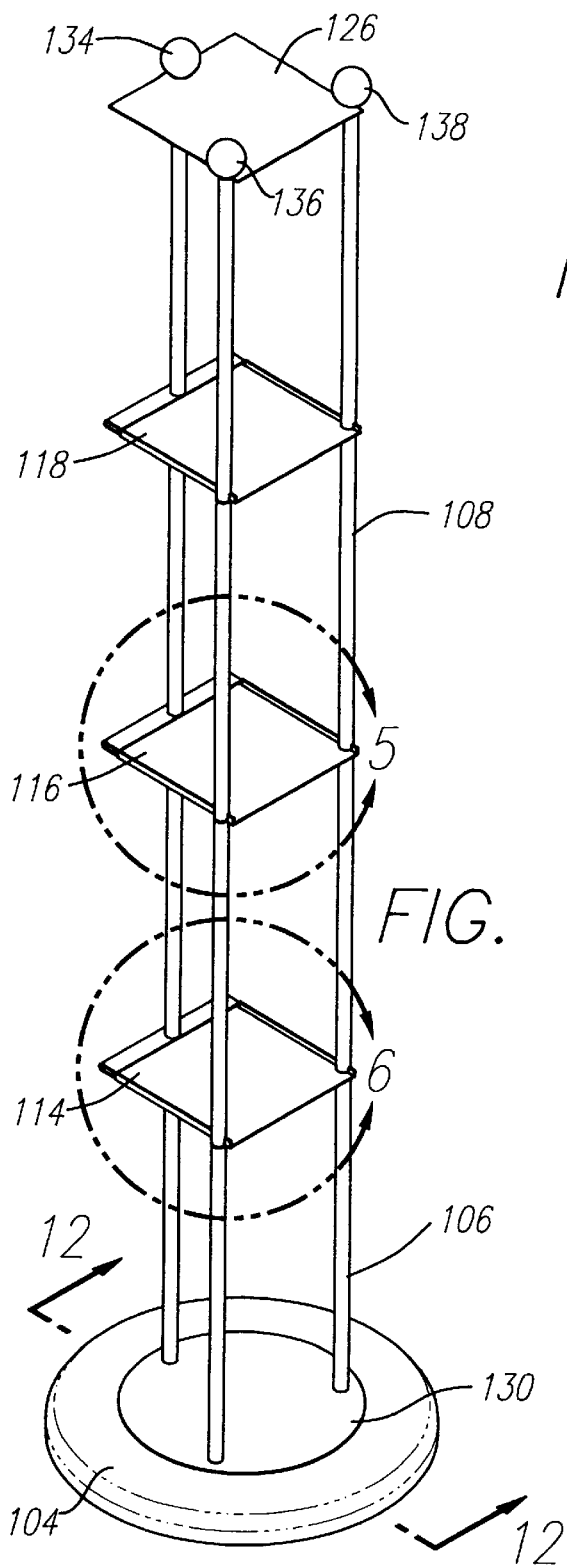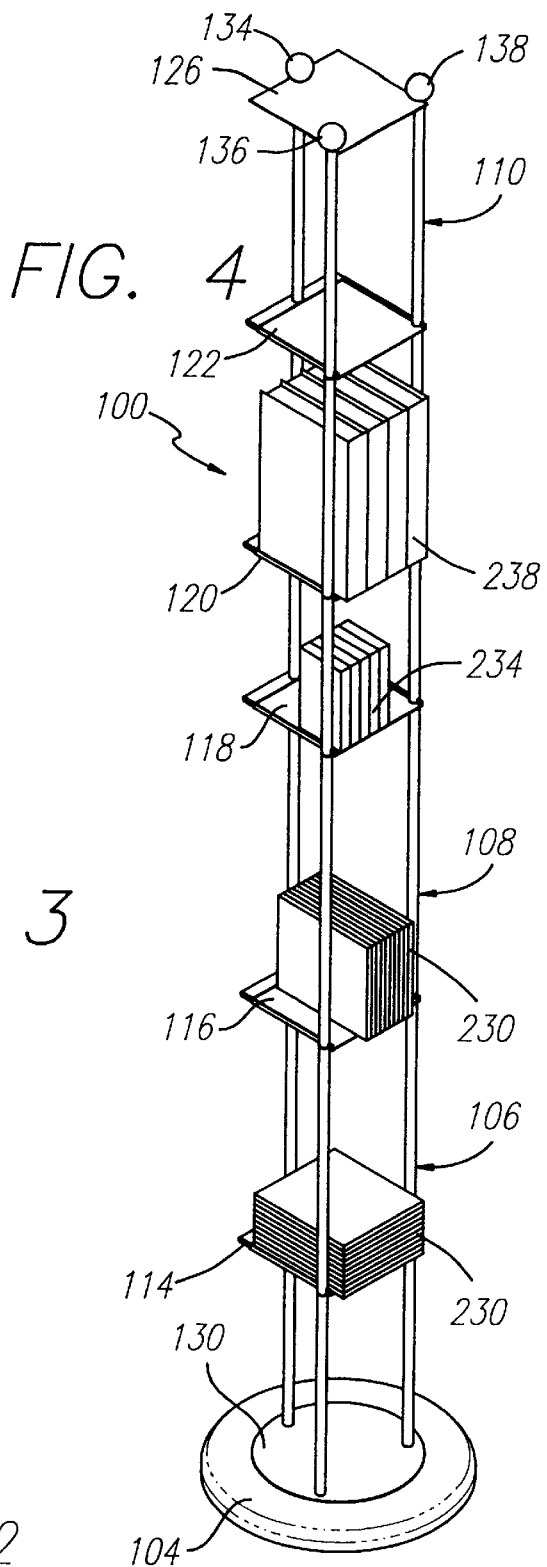

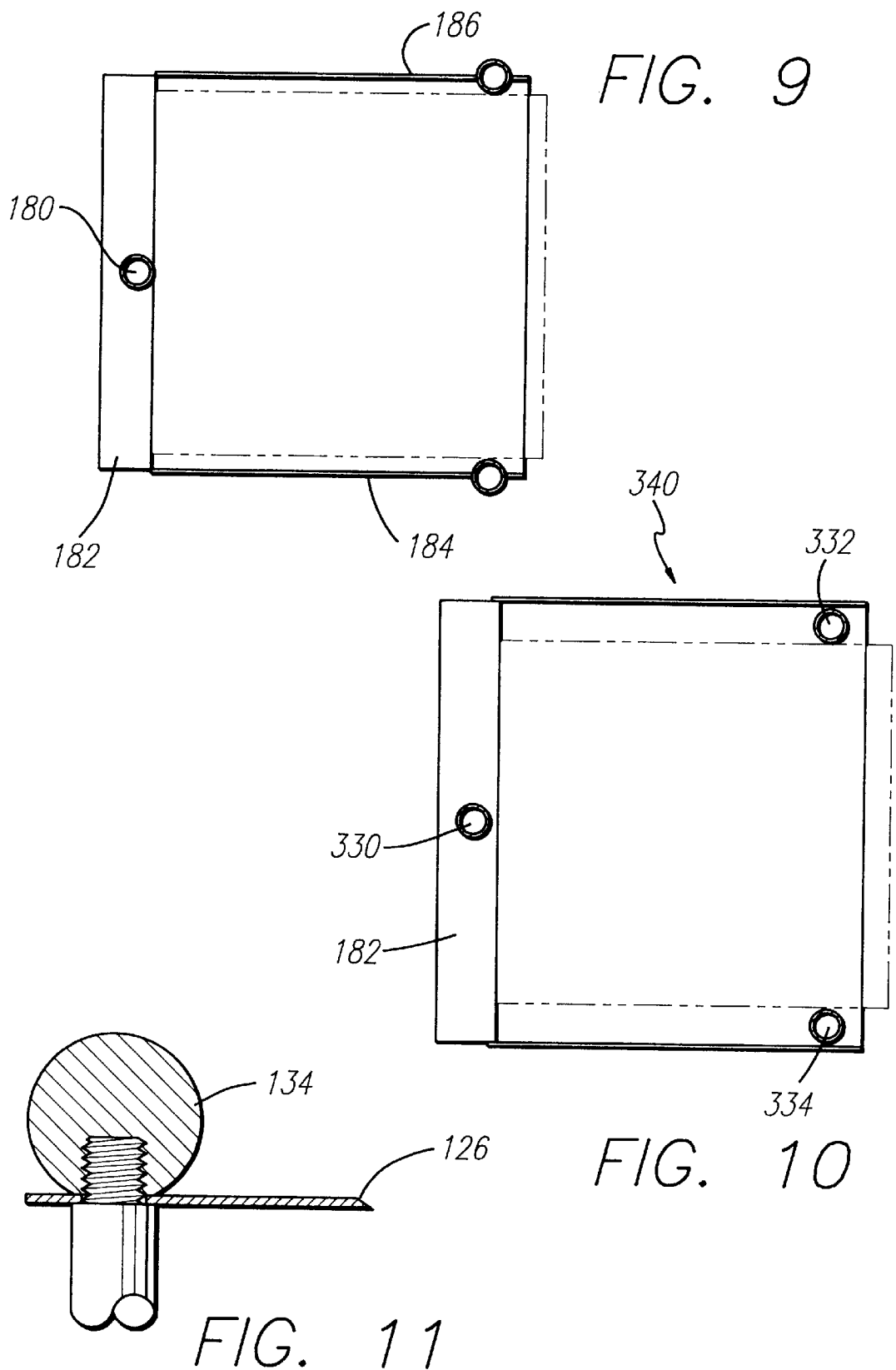

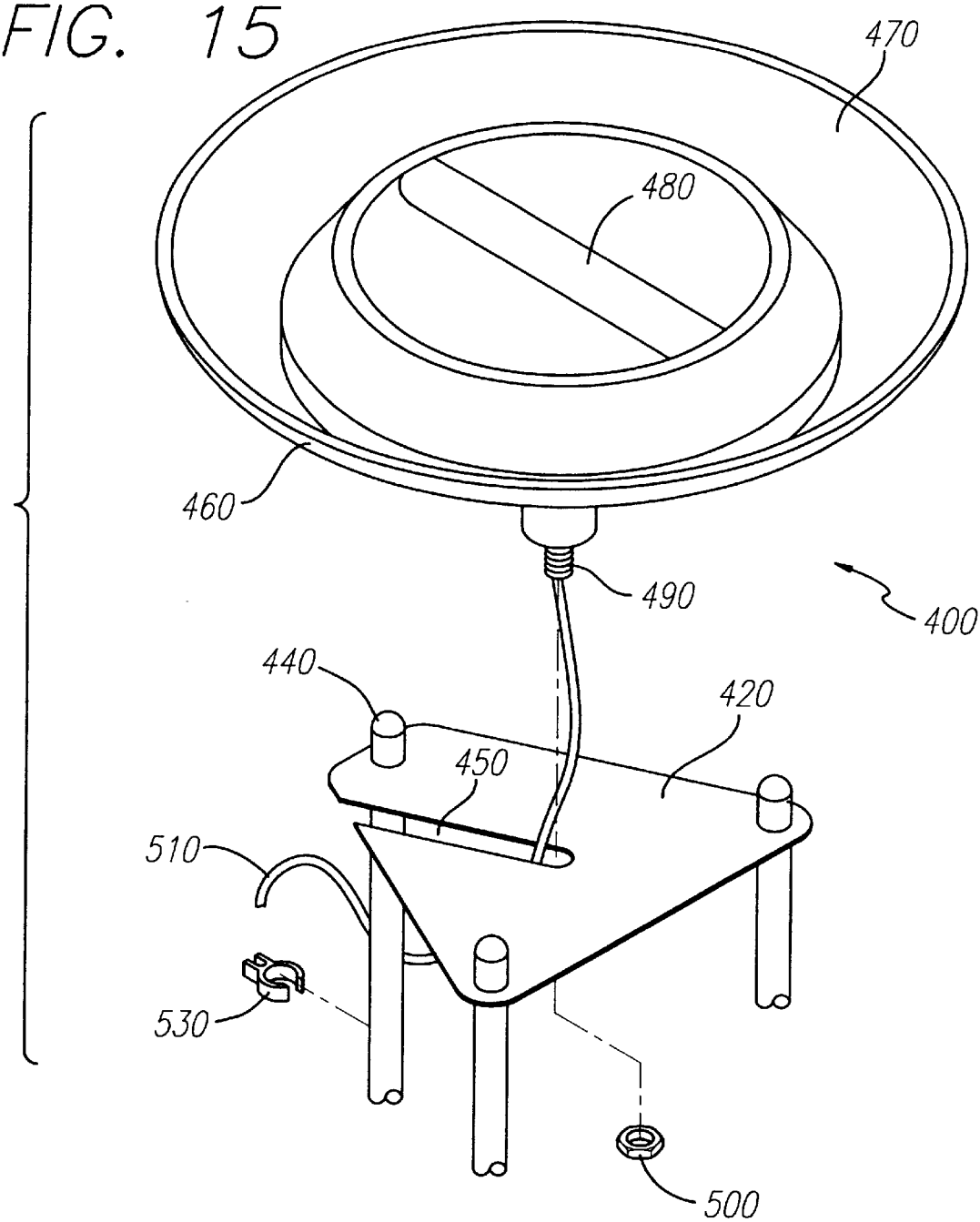
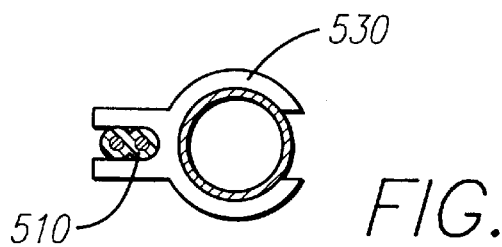

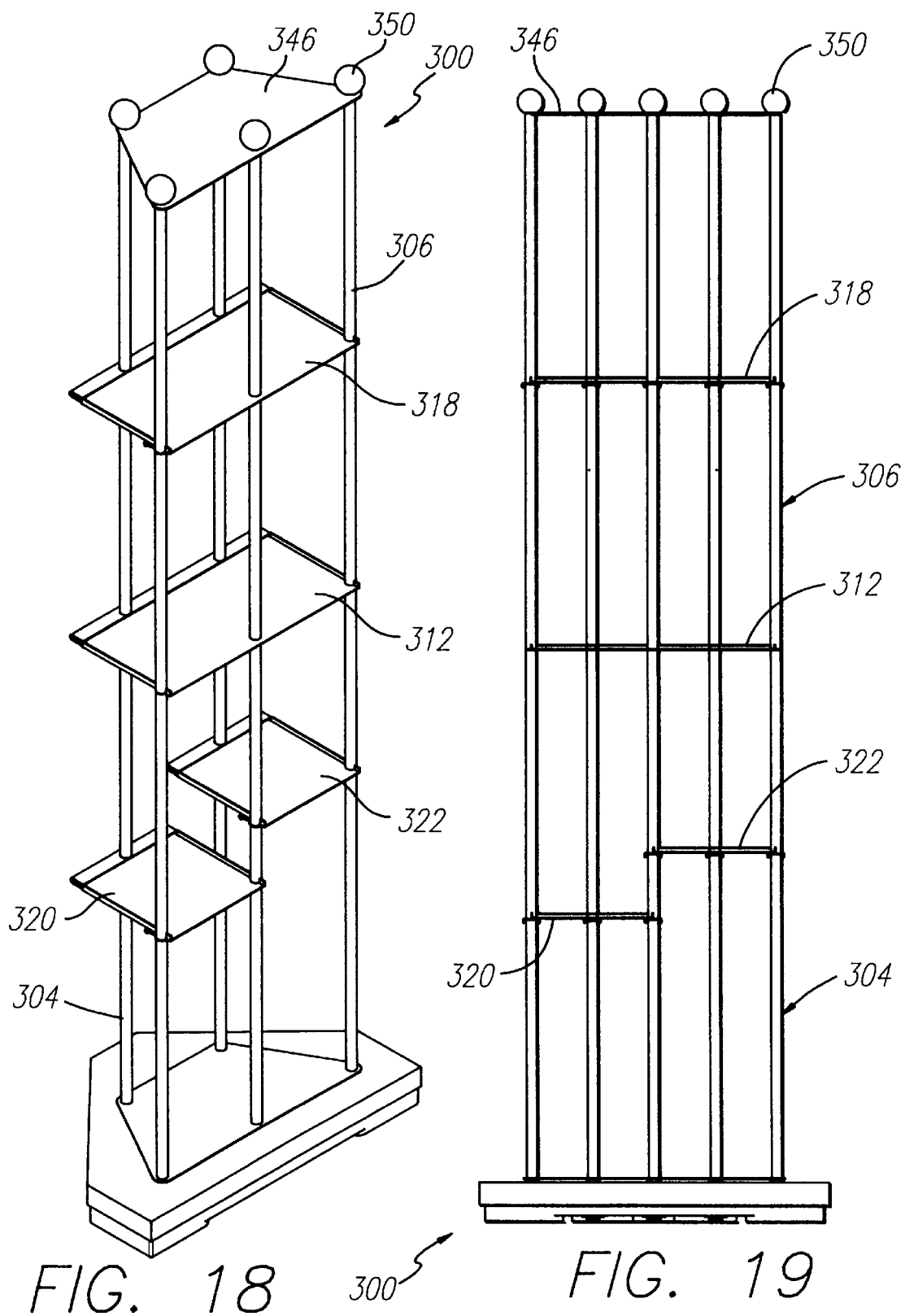

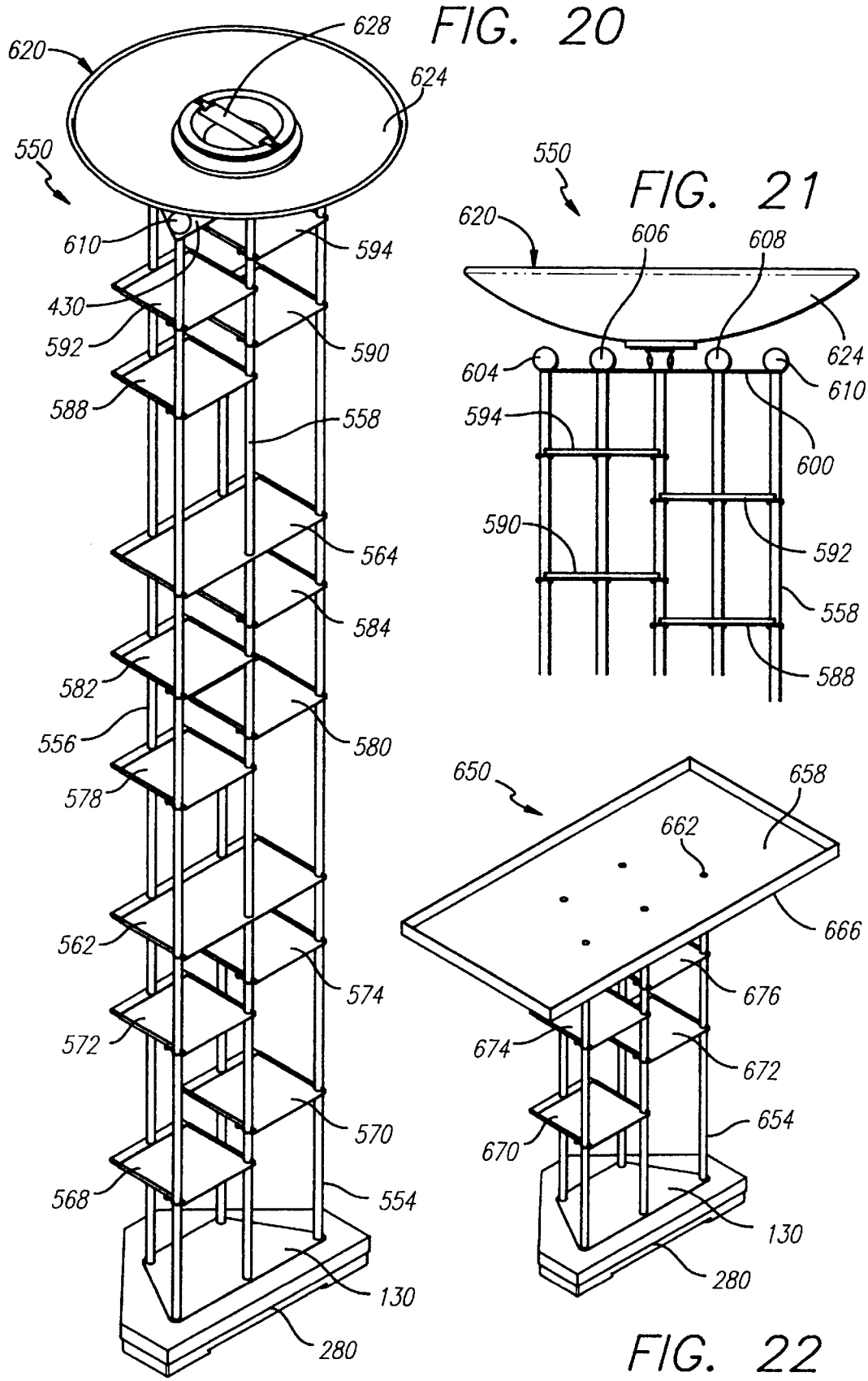

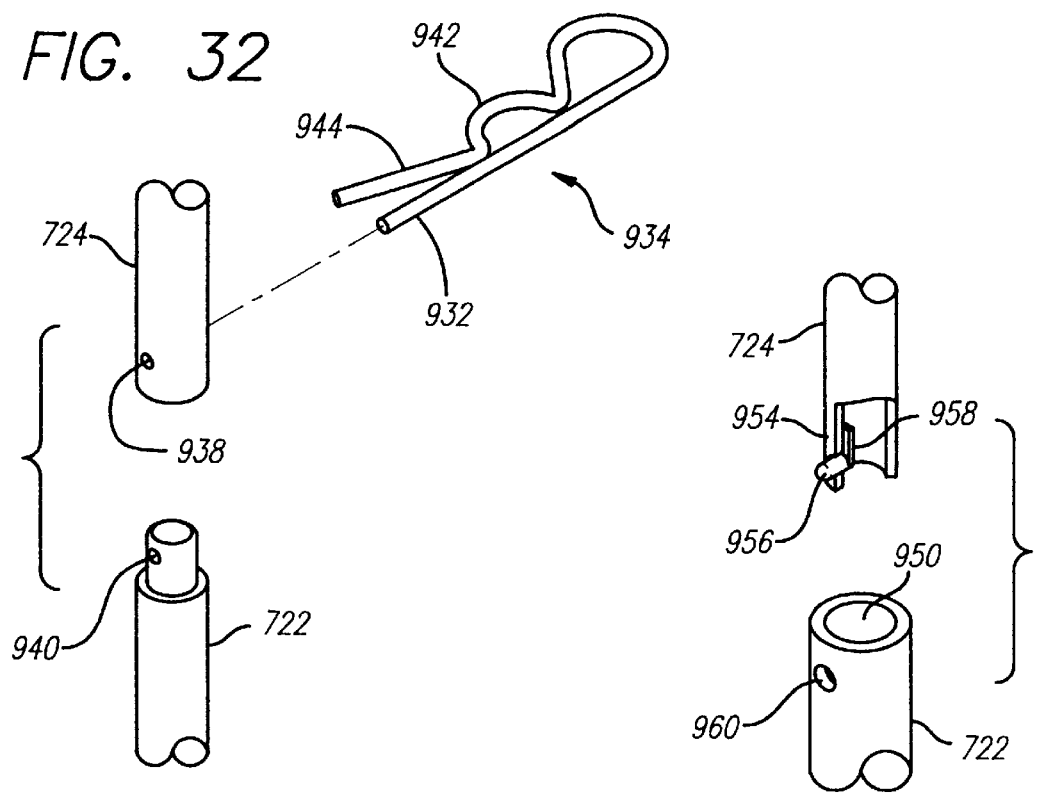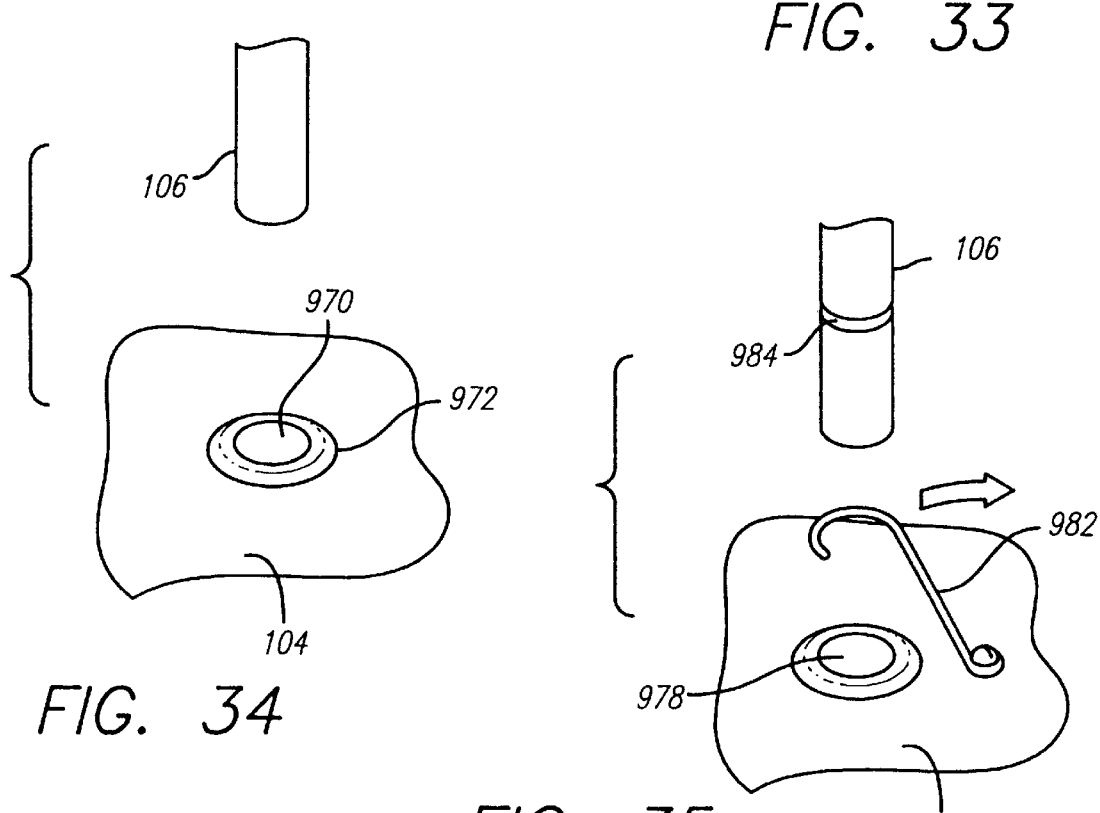

ADJUSTABLE DISPLAY ASSEMBLY

CROSS-REFERENCE TO RELATED APPLECATION

This is a continuation-in-part of application Ser. No. 08/613,926, filed Mar. 11, 1996, now U.S. Pat. No. 5,595,312, and whose entire contents are hereby incorporated by reference.

BACKGROUND OF THE INVENTION

The present invention relates to assemblies for storing and displaying different items and particularly audio/visual media, such as compact disks and video cassettes.

Numerous shelving towers and other structures for storing and displaying compact disks, video cassettes and the like are known. Examples thereof are shown in U.S. Pat. Nos. 5,195,642 to Dardashti and Des. 344,360 to Yeh. However, none of the prior art systems (1) has the flexibility to attractively store and display the disks, cassettes and/or the like in numerous different configurations and arrangements as selected by the user, (2) can be easily and inexpensively manufactured, (3) can be transported, stored and sold in small containers or boxes, (4) can be easily assembled by the user into the desired variable configurations, and when assembled will be structurally sound, and (5) can be easily reassembled into different shelving configurations as desired by the user.

SUMMARY OF THE INVENTION

Directed to remedying the problems and satisfying the needs of the prior art, a novel and improved adjustable storage and display tower assembly is herein disclosed. The tower assembly is provided disassembled and conveniently packaged in a small box. A first set of rods removed from the box is screwed upright in spaced parallel relation to the base assembly and a second set is screwed on to the tops of the first set. Sandwiched between the joined rods at their juncture is a fixed plate shelf. Adjustable plate shelves are slid along the rods to the desired height and held in place with adjustable clamps clamped on the rods there beneath. Each set of rods can consist of three or five rods depending on the desired tower size and configuration. For the five rod embodiment the fixed shelves preferably engage all five rods and hold them together. However, the adjustable shelves can be either large to engage all five rods or smaller to engage only three or various combinations thereof. Third (fourth, etc.) sets of rods can be threaded to the tops of the second sets if additional tower height is desired.

A plate can be positioned at the top of the second (or top) set of rods fixing the tops of the rods together and decorative elements attached to the rod top ends above the plate. Alternatively, a lamp can be mounted at the top of the tower, with its bowl shaped shield facing upward, and its lamp cord clamped out of the way to one of the rods.

One preferred embodiment includes only first and second sets of rods, threaded together preferably with no fixed plate therebetween, although it is within the scope of the invention to include a fixed plate if desired. The base assembly includes a base plate having through-openings, and threaded male lower ends of the rods of the first set are inserted down into respective openings. Female securement base elements are threaded onto the male ends extending through the openings. The plate is thereby releasably secured to the lower ends of the first set of rods. A top plate having openings is similarly secured to the tops of the rods of the second set with female securement top elements. The top plate ties or holds the rods together. The securement base and top elements preferably are decorative balls.

Adjustable shelves are slid along the rods to the desired height, and they rest on squeeze clamps on the rods positioned (by the user) at the desired locations. Each of the shelves has one through-hole through which one rod passes and a pair of opposing side indents (holes engaging the shelf edges) which receive two other of the rods. The shelves can thereby slide along the three rods to the desired location. For a narrower display assembly embodiment where each set of rods consists of three (parallel) rods, the shelves are stacked spaced one directly above the other. In contrast, the wider five rod embodiment allows for a staggered arrangement of the shelves. That is, with the rods secured to the base arranged in a three rod line and a parallel two rod line behind it, two three rod groups are defined with the center rod in the three rod line being in both groups, thereby defining a "W" shape. At least one shelf will slide along and be positionable on one group, and at least another shelf will slide along and be positionable on the other group. Thus, staggered positioning of the shelves is possible. Also, since the side openings are indents engaging the shelf sides, a side-by-side positioning of the shelves on the two groups is possible.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 2 is an exploded perspective view showing a partial assembly of the components of FIG. 1;

FIG. 3 is a perspective view of an assembled (three rod) tower assembly stacked two rods high;

FIG. 4 is a perspective view of an assembled (three rod) tower assembly stacked three rods high with additional adjustable shelves and showing various articles stored and displayed on the shelves;

FIG. 9 is a top view taken on line 9—9 of FIG. 8;

FIG. 10 is a view similar to that of FIG. 9 showing an alternative shelf design;

FIG. 11 is an enlarged cross-sectional view showing the mounting of a ball element at the top of the tower assembly of FIG. 3;

3

Figure 17:
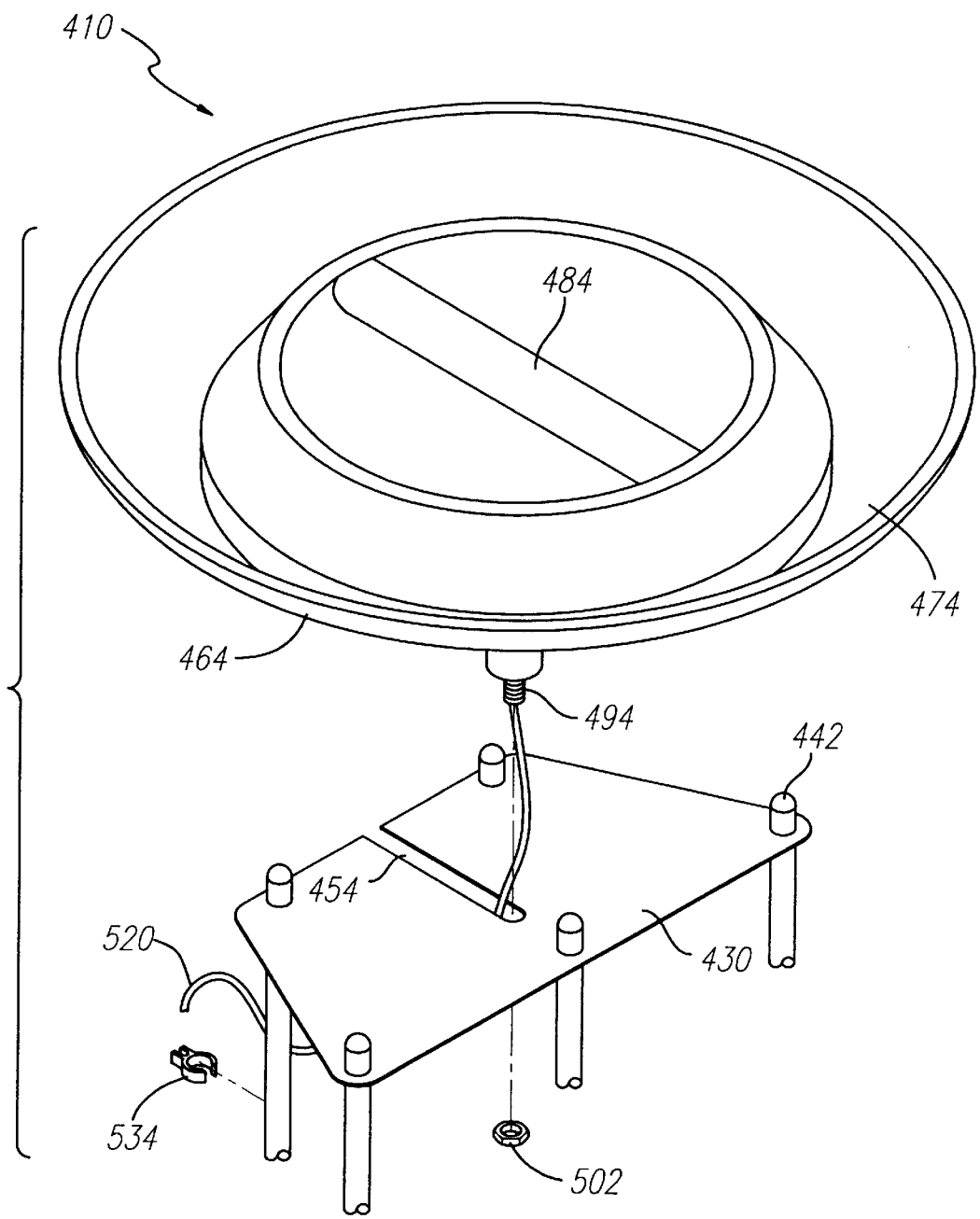
Figure 23:
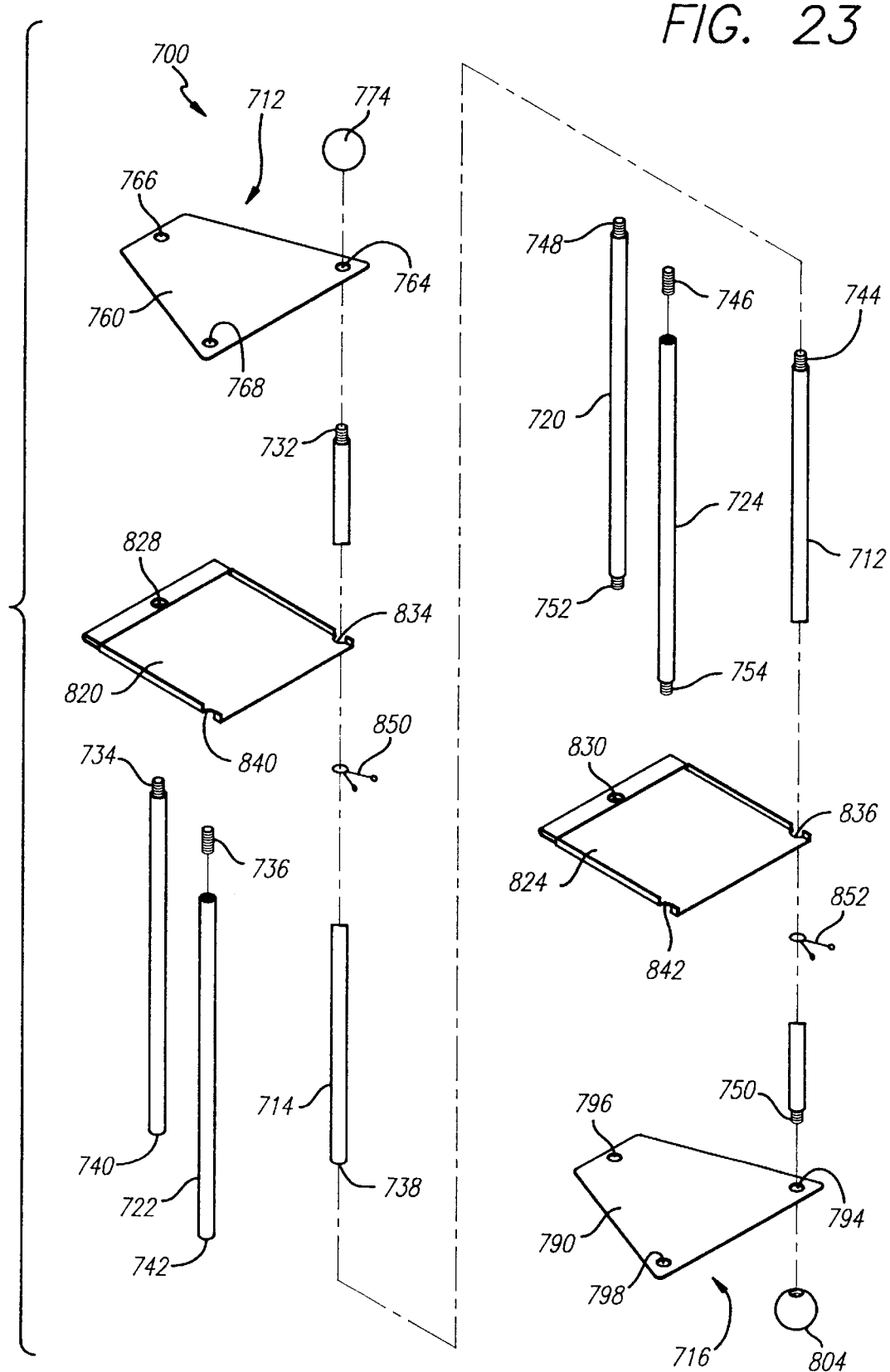
Figure 24:
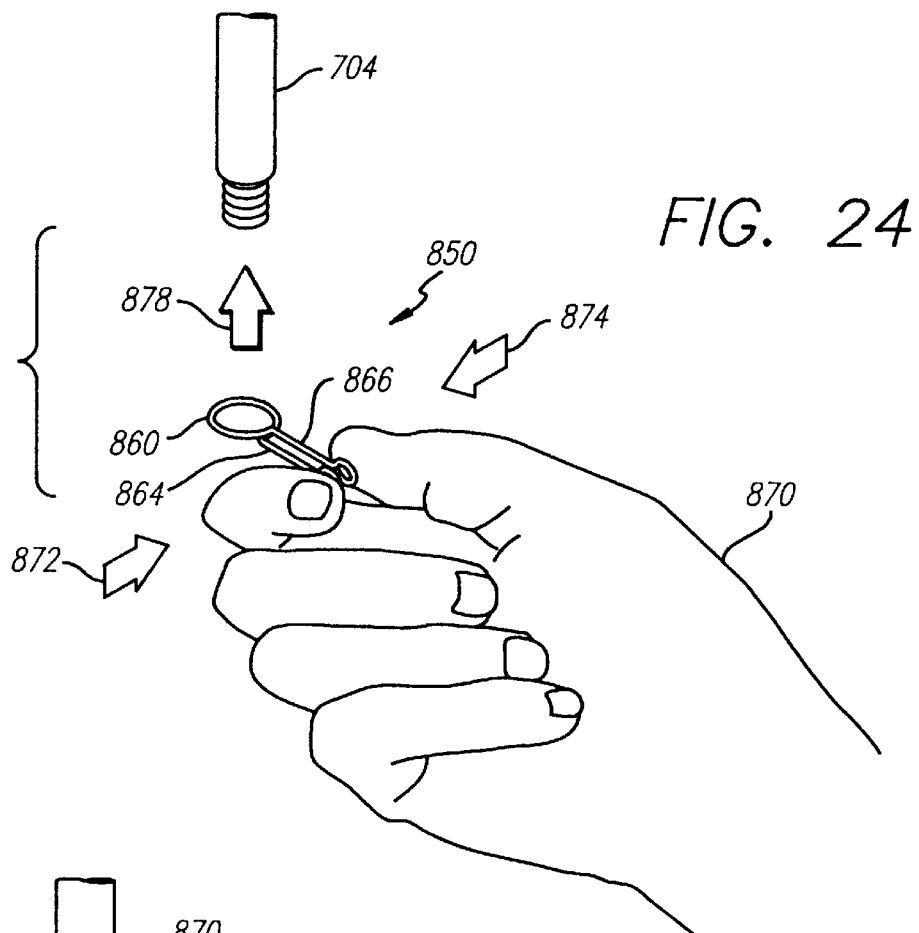
Figure 25:
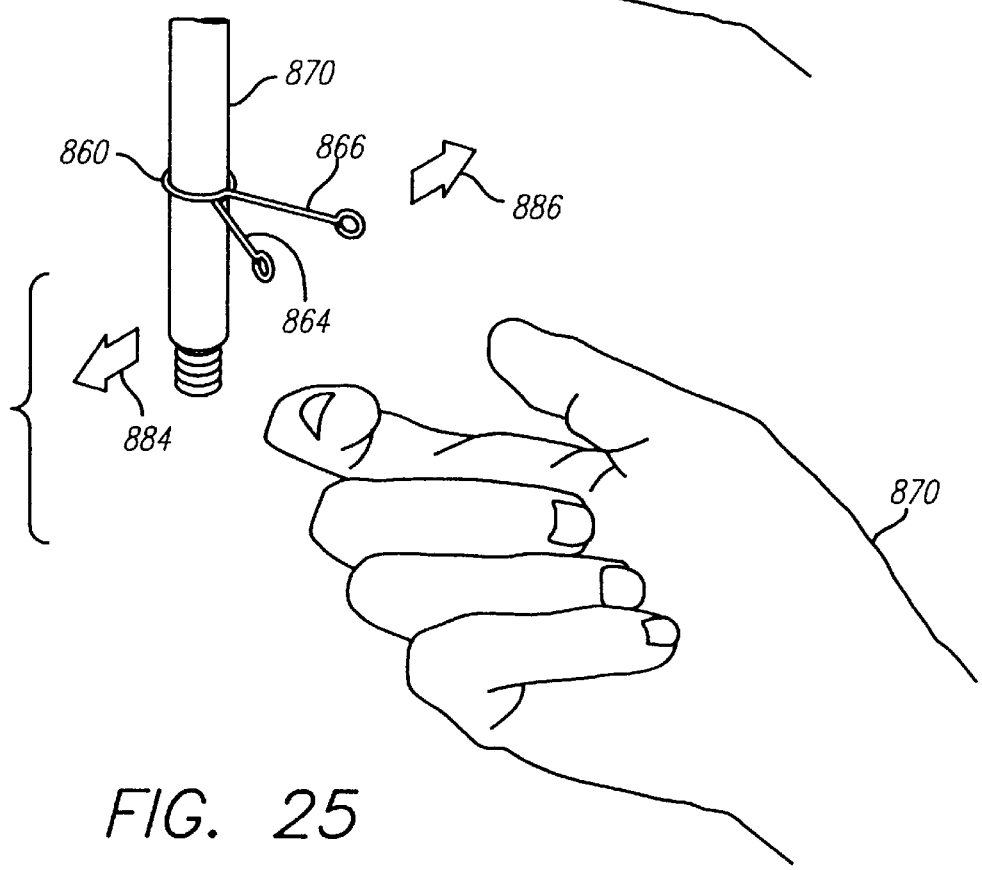
Figure 26:
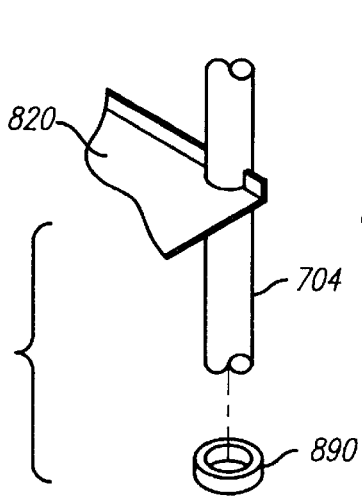
Figure 27:
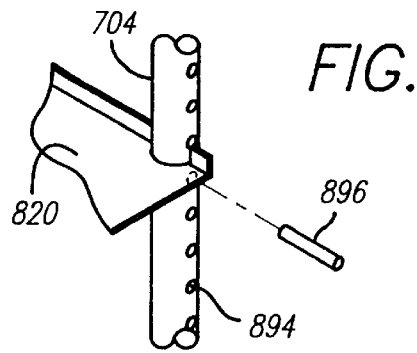
Figure 28:
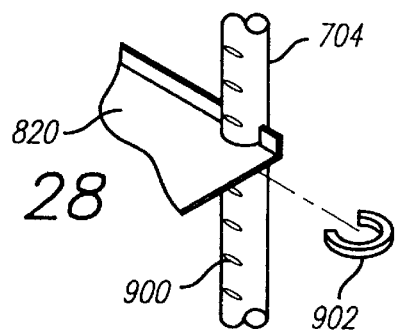
Figure 29:
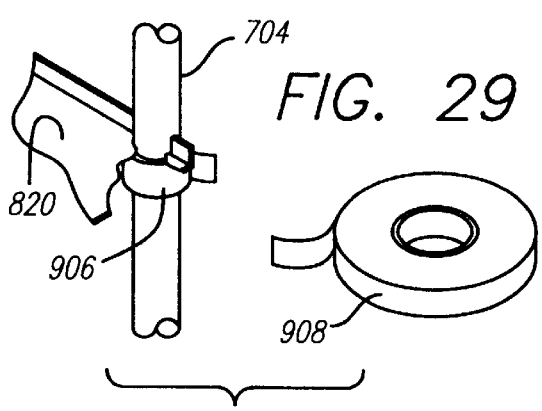
Figure 30:
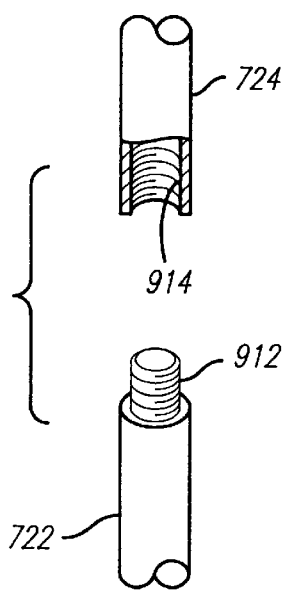
Figure 31:
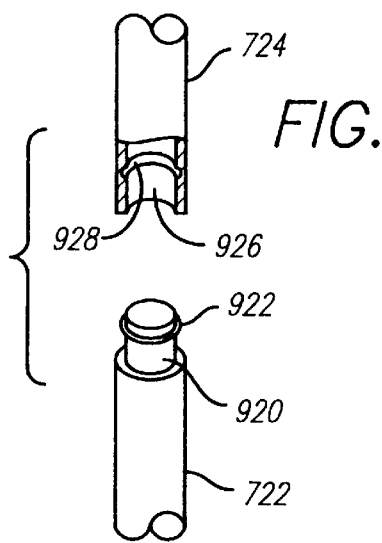
Figure 36:
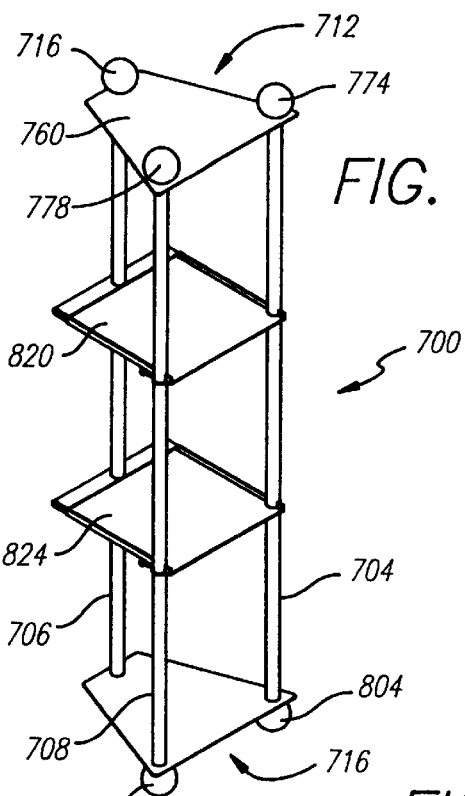
Figure 37:
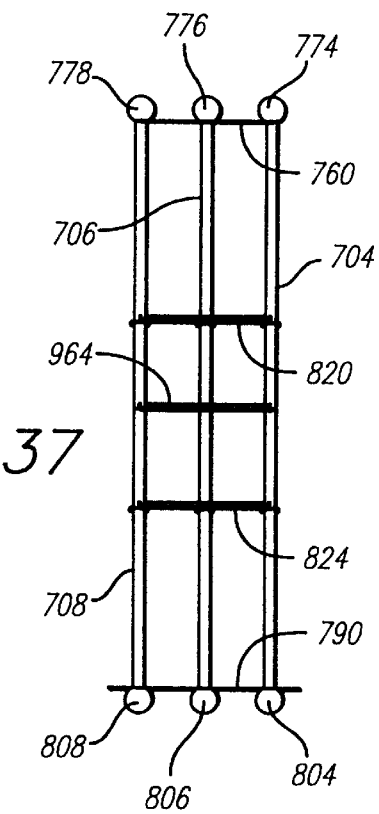
Figure 38:
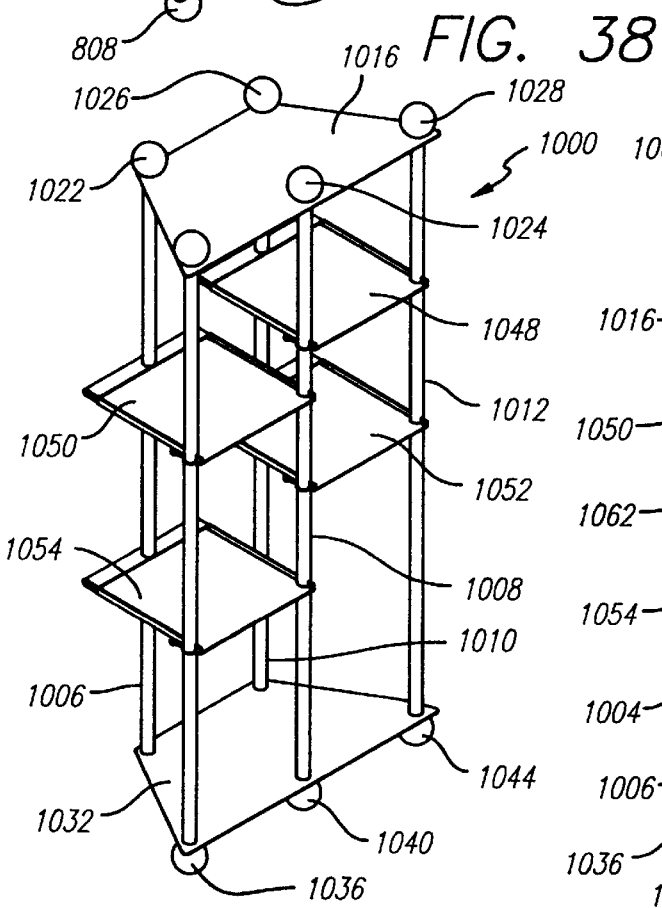
Figure 39:
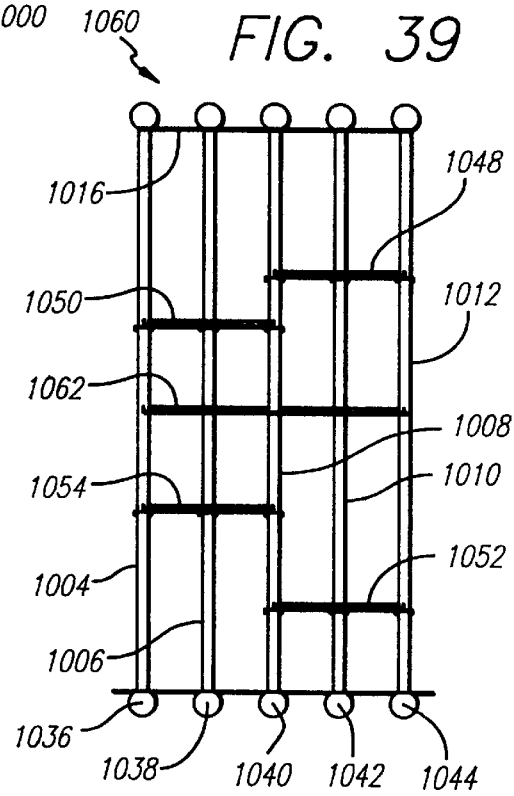

FIG. 15 is a perspective partially exploded view of an alternative lamp top embodiment of a three rod tower assembly of the invention;

FIG. 16 is an enlarged cross-sectional view of the lamp cord clamp of FIG. 15, in place on a tower rod;

FIG. 17 is perspective view similar to FIG. 15 of an alternative lamp top embodiment of a five rod tower assembly;

FIG. 18 is a perspective view of a five rod tower assembly;

FIG. 19 is a front elevational view of the tower assembly of FIG. 18;

FIG. 20 is a perspective view of an alternative five rod tower assembly with a top lamp;

FIG. 21 is a rear elevational view of a top portion of the tower assembly of FIG. 20;

FIG. 22 is a perspective view of a display stand assembly embodiment of the present invention;

FIG. 23 is an exploded perspective view of portions of a three-rod table top assembly of the present invention;

FIG. 24 is a perspective view showing the process of positioning a squeeze clamp on one of the rods of the assembly of FIG. 23 (or any of the other embodiments disclosed herein);

FIG. 25 is a perspective view, similar to FIG. 24, and showing the step of releasing the squeeze clamp after being slid to the desired location on the rod for holding a shelf thereon;

FIG. 26 is a partial perspective view of a first alternative shelf holder (instead of the squeeze damp of FIGS. 23 and 24, for example);

FIG. 27 is a partial perspective view of a second alternative shelf holder;

FIG. 28 is a partial perspective view of a third alternative shelf holder;

FIG. 29 is a partial perspective view of a fourth alternative shelf holder;

FIG. 30 is a partial perspective view of a first alternative rod-to-rod securement;

FIG. 31 is a partial perspective view of a second alternative rod-to-rod securement;

FIG. 32 is a partial perspective view of a third alternative rod-to-rod securement;

FIG. 33 is a partial perspective view of a fourth alternative rod-to-rod securement;

FIG. 34 is a partial perspective view of a first alternative rod-to-base securement;

FIG. 35 is a partial perspective view of a second alternative rod-to-base securement;

FIG. 36 is a perspective view of the three-rod table top assembly of FIG. 23 shown assembled;

FIG. 37 is a front elevational view of a variation of the assembly of FIG. 36;

FIG. 38 is a perspective view, similar to FIG. 36, of a five-rod table top assembly of the invention; and FIG. 39 is a front elevational view of a variation of the assembly of FIG. 38.

DETAILED DESCRIPTION OF PREFERRED EMBODIMENTS OF THE INVENTION

Referring to the drawings, a number of different embodiments of the present invention are illustrated. Two prime advantages of the present invention are first that it can be manufactured and provided to the consumer in small boxes. The small boxes make it easier and cheaper for the manufacturer, distributor and ultimate user to store, ship and display. The second advantage is that the present assembly is very flexible in its use allowing it to be built and also subsequently modified and even its height adjusted as needed to accommodate the storage and display of different articles as needs may vary and also to provide an alternative lamp arrangement.

Figure 1:
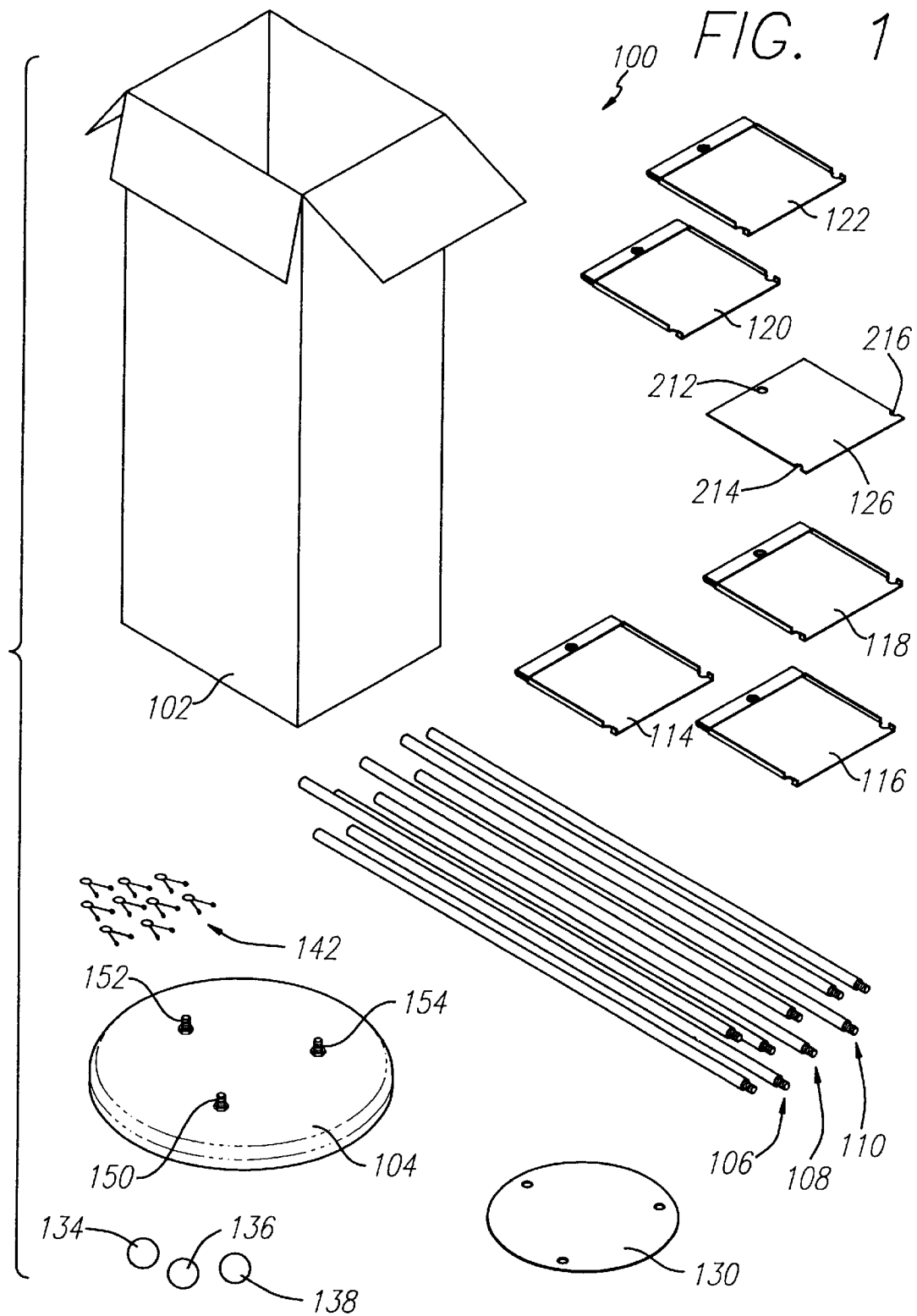
FIG. 1 is a perspective view of the components of one storage and display tower assembly of the present invention shown ready for assembly.

One of the simpler embodiments of the present invention is illustrated in disassembled form in FIG. 1 generally at 100 (and assembled in FIG. 4). Referring thereto it is seen that all the components come packaged in a box 102. The components include a heavy weighted base assembly 104, first, second and third sets of (three) rods 106, 108, 110, a plurality of shelves 114, 116, 118, 120, 122, a top fixed plate 126, a base plate 130 for placement on the base assembly, three decorative top balls 134, 136, 138, and a plurality of clamps shown generally at 142. As can be understood from FIG. 1, with all these components disassembled they can be placed and packaged into a small container such as the box 102 illustrated therein.

The assembly of the storage and tower assembly 100, one embodiment of which is shown in FIG. 4, for example, is relatively easy. It is anticipated that an instruction sheet (not shown) will be provided in the box 102 explaining the assembly steps. The instruction sheet, for example, can include an exploded perspective view such as shown in FIG. 2. However, simply from an assembled picture such as might be provided on the front of the box 102 itself and from examination of the components, most people would be able to assemble this storage and display assembly 100 with relative ease.

Referring thereto, it is seen that the weighted base assembly 104 is provided with three upstanding threaded members 150, 152, 154, over which a base plate 130 is fitted through its three openings. The first set of three rods 106 are therein threaded onto respective ones of the top portions of the threaded members 150, 152, 154 extending up from the base assembly 104. A first adjustable shelf 114 is slid via its openings onto and over the three rods with three support clips 142 being first slid down on the respective rods. These clips 142 support the adjustable shelf 142 at the desired height and location on the three rods as selected by the user. (Markings can be provided on the rods to show preferred clip or shelf locations, if desired.) One embodiment of the clips 142 would allow them to be fitted on the rods 106 without having to slip over one of the rod ends. (See, e.g., FIGS. 27, 28 and 29.) This would allow the clips 142 to be attached to the rods 106 after the rods have been assembled and the shelves 114 in place should it become necessary to do so. This could be, for example, if the user forgot to first attach the clips or one or more are needed to be replaced.

Figure 7:
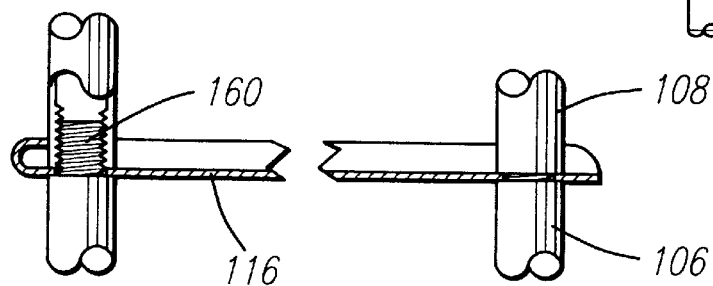
FIG. 7 is a partial enlarged cross-sectional view taken on line 7—7 of FIG. 5.

At the tops of each of the rods of the first set are threading members 160, 162, 164 which are threaded into the top threaded openings of the respective rods 106 to extend a slight distance above the top surfaces of the rods as can be understood from the top left of FIG. 2. A fixed shelf 116 is then placed on top of the first set of rods 116. Its openings will be smaller than those of the adjustable shelf 114. They will be large enough to pass over the threaded top members 160, 162, 164, but small enough so as to rest on the tops of the rods 106. That is, they will be supported on the top ledges defined by the tops of the rods, as can be understood from FIG. 7. The rods of the second set 108, each of which has a threaded opening in its bottom end, are then threaded on top of the screw threaded members 160, 162, 164 of the first set 106 to extend straight thereabove. Thereby, the fixed shelf 116 will be sandwiched between the first and second sets of rods 106, 108 as shown in FIG. 7, for example. The second set of rods 106 will then be linearly aligned with respective ones of the rods of the first set 104. And the fixed shelf 116 will be sandwiched between the rods. The fixed shelf 116 not only provides a display and storage shelf function but also helps to fix the rods 104, 106 in a triangular relationship relative to one another.

Adjustable shelves 118 and their clamps or clips 142 will then be fitted down on the top ends of the second set of rods 106. As shown in FIG. 2, for example, each of the shelves (both the fixed and the adjustable shelves) has a through-opening 180 passing through a rear lip 182, side rims or lips 184, 188 on the two adjacent sides and openings 190, 192 through those side lips. Those openings 190, 192 will preferably not be complete circles spaced in from the edges of the shelves, but rather will engage the edges and define simple crescent shapes. However, they may be full openings as shown in FIG. 10. The advantage of the crescent shape openings will be discussed later with respect to that figure. The through-hole 180 through the folded-over portion 182 of the shelf should pass through the same rod as the corresponding through-holes of the other shelves. This is so that the backs of each of these shelves are aligned, and all the shelves face forward in the same direction, as shown in FIG. 3 for example.

If additional height of the tower assembly 100 is desired for aesthetic reasons, to provide additional storage space, and/or to raise the lamp for the lamp embodiment (which will be described later), a third (and a fourth, etc.) set(s) of rods 110 can be similarly screwed into the top of the second set 106 of rods. Similar to the first and second sets of rods 106, 108, a fixed plate 120 is sandwiched in between the tops of the second set of rods and the bottom of the third set of rods 110. Similar adjustable shelves and clips can be slid into place along the rods of the third set 110.

Figure 5:
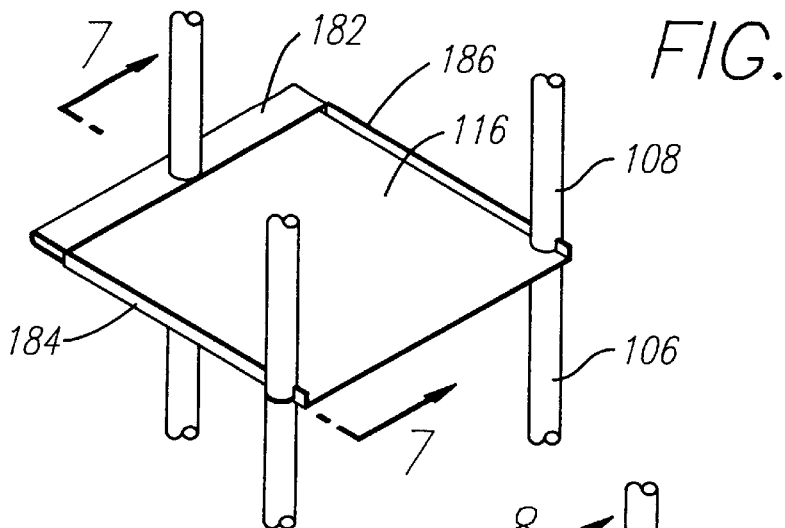
FIG. 5 is an enlarged perspective view taken on circle 5 of FIG. 3 and showing a fixed shelf mounting of the tower assembly.

When the desired number of sets of rods or the desired height of the tower have been obtained (and it is anticipated that either two or three sets would be the preferred number), a top structure is attached to the top set of rods. One top structure embodiment includes the flat plate 126 which also has a through-hole 212 and two crescent holes or openings 214, 216 to mount to the top threaded portions of the top rods. Decorative balls 134, 136, 138 (as shown in isolation in FIG. 1) having threaded openings are then threaded into place on the exposed end portions of the top rods, as shown in FIGS. 3 and 4, for example. An enlarged crosssectional view showing the mounting of one of the balls 134 and the top plate 126 is provided in FIG. 11. FIG. 3 shows an example of a three rod embodiment which is stacked two sets of rods 106, 108 high with the fixed shelf 116 being shown in detail in FIG. 5 and its mounting shown in cross-section in FIG. 7.

FIG. 4 shows the storage and display assembly of the invention wherein each set of rods 106, 108, 110 consists of three rods, and three sets of these rods are stacked and secured one on top of the other. In other words, the illustration of FIG. 4 is a smaller scale (for drawing convenience) than the illustration of FIG. 3 since it is essentially one third taller. FIG. 4 also shows how various articles can be stored and displayed on the shelves. Examples of the articles are compact disc (CD) cases 230 which can be stored horizontal flat such as shown on the bottom shelf or on their sides edges as shown in the next shelf, audio cassettes 234 as shown in the shelf thereabove, and video cassette boxes 238 as shown in the shelf immediately thereabove. It will be appreciated that the rims or lips 184, 188 on the sides of the shelves block the free sliding of the articles off the sides of the shelves especially the smaller articles. And the back rim 182 prevents a free sliding of the articles off the back end of the shelves such as for the cassette disks 230 when mounted on their edges.

Figure 12:
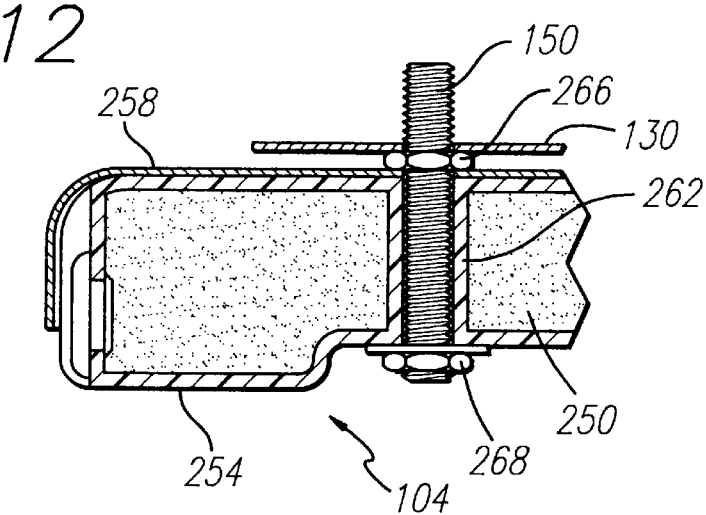
FIG. 12 is an enlarged partial cross-sectional view taken on line 12—12 of FIG. 3.

The base assembly 104 itself can be provided in many shapes and sizes, but should be wide and long and heavy enough to prevent tipping of the assembly. A number of different shapes of the base assembly as illustrated in the drawings such as in FIGS. 13 and 14 will be discussed. FIG. 12 shows a partial cross-section through the base assembly 104 of FIG. 3 and shows that a heavy material, such as sand 250, is enclosed in a housing 254 and has a top cover 258. Vertical sleeves 262 extend through the interior of the base to receive the threaded members 150 (or 152 or 154), which are threaded with nut like members 266, 268 to hold the threaded member in place. And the base plate 130 is illustrated on top.

Figure 13:
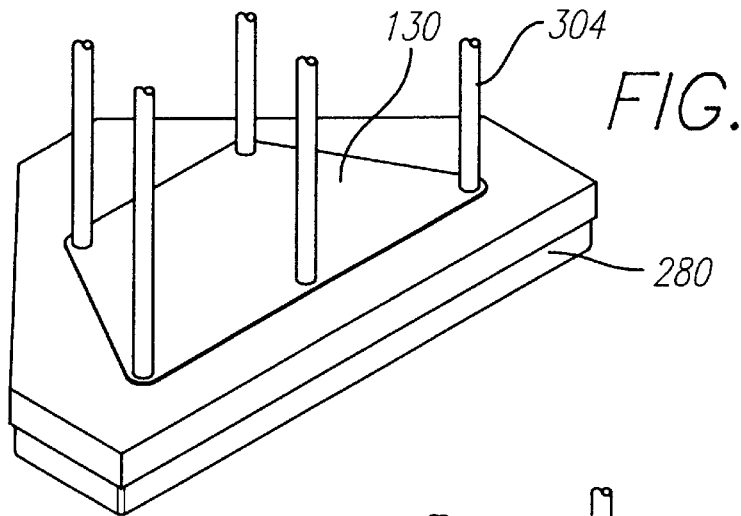
FIG. 13 is a perspective view of a bottom portion of an alternative (five rod) tower assembly of the present invention.
Figure 14:
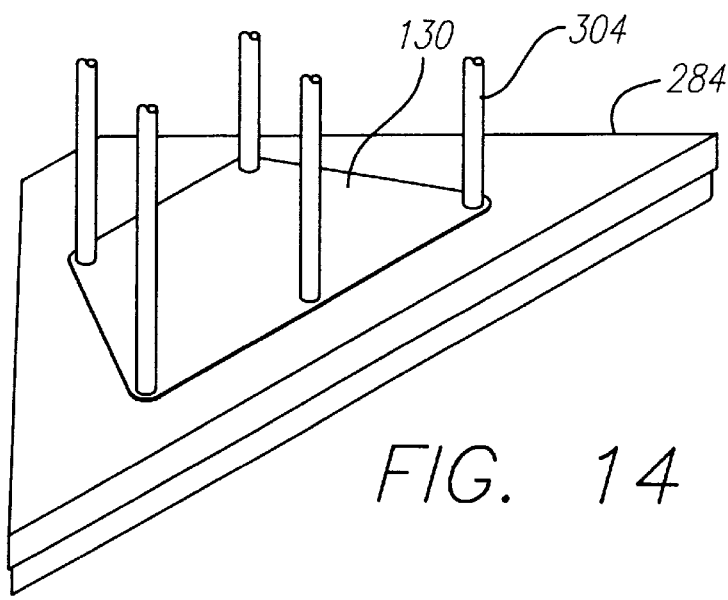
FIG. 14 is a view similar to FIG. 13 showing an alternative base configuration of a five rod tower assembly of the invention.

FIGS. 3 and 4 show embodiments wherein each set of rods consists of three rods. In contrast, FIGS. 13 and 14, for example, show a five rod embodiment. The three rod embodiments are arranged in a triangular relationship with the apex being the rear of the assembly 100. For the five rod embodiment, the rods are arranged in a trapezoid shape with four of the rods defining the corners and the fifth rod being in the center of the long front portion of the trapezoid. FIGS. 13 and 14 show examples of two different base assembly shapes, as shown at 280 and 284, as well as the support plate 130. The five rods are secured one on top of the other similar to the previously-described three rod sets. The five rod assembly shown generally at 300 in FIGS. 18 and 19 has two sets of five rods 304, 306.

The five rod assembly 300 is also provided with fixed plate(s) or shelf (shelves) 312 at the junction between adjacent rods 304, 306. The fixed shelf 312 similarly provides for not only storage and display surfaces, but also helps fix or tie the rods 304, 306 together. While the fixed plate 312 should preferably be large enough to include all five rods, that is, have five openings spaced each for a respective rod, the adjustable plates need not also be large enough to include all five rods, such as plate 318. Rather, some, all or none may be smaller three rod plates such as are used in the embodiments of FIGS. 3 and 4 and shown by reference numerals 320 and 322 in FIGS. 18 and 19.

By using the smaller three rod plates 320, 322 for the five rod type of display assemblies, held at the desired location with adjustable clips, in various combinations and arrangements, various aesthetically pleasing configurations can be provided. It also makes for a configuration which can be easily changed to accommodate different storage items. A preferred embodiment is to stagger the three rod plates 320, 322 such as shown in FIGS. 18 and 19 and the lower portion thereof. They need not be staggered but can be positioned (horizontally) adjacent one another. However, when they are adjacent, they cannot stick out so far towards each other as to interfere with each other. In other words, if they had a full width with three full openings 330, 332, 334, such as the embodiment of FIG. 10 shown generally at 340, they would overlap and interfere with each other. That is why the narrower embodiment of FIG. 9 is preferred for use with the five rod tower assembly. Even when the plates 320, 322 are not placed directly adjacent one another the user may want to slide one past the other to reposition the shelves, and the embodiment of FIG. 9 allows for this.

For the three rod embodiment there are certain advantages to using the wider adjustable shelves 340 such as shown in FIG. 10. For manufacturing convenience, however, when the manufacturer is manufacturing the kits for both three and five rod embodiments it is preferable to only make a single design of a three rod adjustable shelf, that is one that can be used for both the three rod and the five rod embodiments. Hence, the shelf of FIG. 9 with the one through opening and the two crescent-shaped side openings is shown in FIGS. 3 and 4, for example.

FIGS. 18 and 19 show two sets of five rods 304, 306 stacked one on top of the other, with the two smaller adjustable plates 320, 322 at the bottom and a large five hole adjustable plate 318 in the upper portion, held in place with clips (142) or the like. Of course, one or more additional sets of five rods can be threaded to the tops of the uppermost set to extend the height of the assembly as may be desired.

The embodiments of FIGS. 18 and 19 show a flat top plate 346 at the top of the uppermost rods. This is similar to the top plate shown in FIGS. 3 and 4 for the three rod embodiment. It can be a simple flat plate unlike the shelf which has raised rims on the sides and the end. Decorative balls 350 can be threaded on top thereof in an arrangement similar to that illustrated in FIG. 11, to hold the plate in place.

Instead of the flat plate and balls as shown in FIGS. 3, 4, 18 and 19, a lamp embodiment can be used as shown in FIGS. 15 and 17. The FIG. 15 arrangement as shown generally at 400 is for the three rod embodiment(s), and the FIG. 17 arrangement as shown at 410 is for the five rod embodiment(s). Each of them has a flat plate 420, 430, respectively, fitted onto the top of the top screws of the uppermost rods. Plain nuts 440, 442 are shown threaded on top of the plates 420, 430 to hold them in place and to provide a decorative, more attractive appearance. The plates 420, 430 also have a slot 450, 454 extending from a rear edge thereof to the center and in through which the bottom portion of an upwardly facing lamp 460, 464 is slid.

The lamp 460, 464 has an upwardly disposed bowl or shield 470, 474 reflecting the light upward against the adjacent ceiling and walls and a bulb 480, 484 in the center. Depending down from the shield is a threaded member 490, 494 which fits into the slot 450, 454 and a nut 500, 502 is threaded to the bottom of this threaded member on the opposite side of the plate 420, 430 to fix the lamps in place. The electrical cord 510, 520 for the lamp 460, 464 can be held out of the way to one of the back rods with a clamp 530, 534, such as shown in FIGS. 15 and 17 and shown in greater detail in operation in FIG. 16. Other clamps or clips can be provided as would be apparent to those skilled in the art. The clamps 530, 534 not only hold the wire 510, 520 so that it is less visible, but also so that it is less likely to become caught or otherwise entangled.

A number of variations and alternative embodiments of the invention are illustrated in FIGS. 20 through 39. Some of the components therein are designated with the same reference numerals as corresponding components of the previously described embodiments. The numerous alternative embodiments illustrated herein underscore the flexibility of use and application of this invention.

Figure 6:
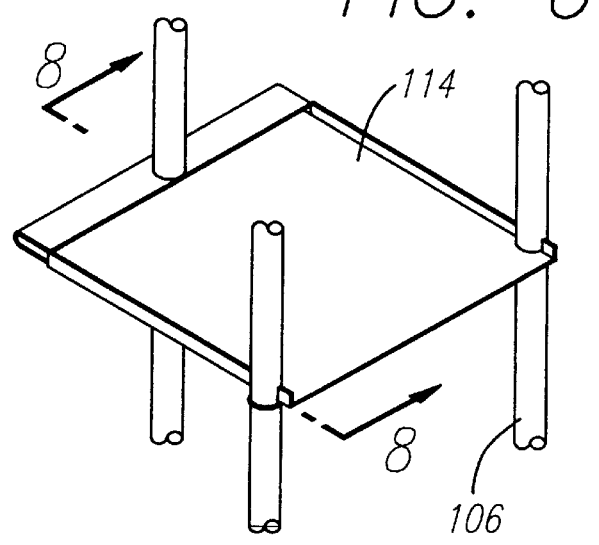
FIG. 6 is an enlarged perspective view taken on circle 6 of FIG. 3 and showing an adjustable shelf mounting.
Figure 8:
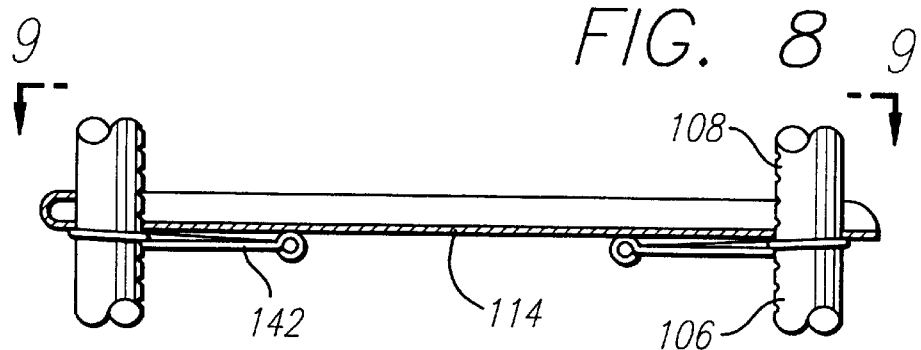
FIG. 8 is an enlarged cross-sectional view taken on line 8—8 of FIG. 6.

FIGS. 20 and 21 show generally at 550 another adjustable tower assembly. Assembly 550 includes a base assembly 280, a base plate 130, and three sets of five rods 554, 556, 558, respectively. Fixed (five-rod) shelves 562, 564 are sandwiched respectively at the junctures of the first and second sets of rods 554, 556 and the second and third sets of rods 556, 558, respectively. As illustrated in FIG. 20, four adjustable (three-rod) shelves 568, 570, 572, 574 are provided for the first set of rods 554, and similarly four adjustable shelves 578, 580, 582, 584 are provided for the second set of rods 556 and four 588, 590, 592, 594 for the third set 558. These adjustable shelves can be constructed similar to shelf 114 as shown in FIGS. 6, 8 and 9. Also, these adjustable shelves are held in position at the desired height on their respective rod sets by squeeze clamps 142 as shown for example in FIGS. 2 and 8.

A top plate 600, as best shown in FIG. 21, has five through-holes, positioned to receive up therethrough the threaded male ends at the tops of each of the rods of the third set 558. Spherical elements 604, 606, 608, 610, 612 are threaded onto the top protruding ends of the rods, as can be understood from FIG. 11, for example. These balls not only releasably secure the top plate 600 in place, but also are attractive.

The top plate 600 has an opening (hole or slot) down through which the threaded lower end of the lamp shown generally at 620 is inserted for securement by a nut or the like, as can be understood from FIG. 15, for example. Thus, the top plate 600 not only serves to structurally tie together the rods (more particularly, the rods of the top set 550), but also provides a mounting structure for the lamp 620. The lamp 620 includes an upwardly disposed bowl shield or reflector 624, a bulb 628 and an electric wire held out of the way with a clamp (534).

A display stand assembly embodiment of this invention is depicted generally at 650 in FIG. 22. It includes a base 280, a plate 130 and a five-rod set shown generally at 654. A plate 658 is secured at the top of the rods of set 654 using five counter-sunk screws 662 which are screwed down through preformed holes in the plate 658 into threaded openings in the tops of the rods. The plate 658 can have an upstanding lip 666 about its perimeter. The plate 658 has preferred length and width dimensions of twenty-seven inches and fourteen inches, both of which are greater than those of the base assembly 280, which has a length of 15¾ inches. Because the plate 658 is provided for supporting objects, such as books, telephones, lamps, televisions, vases or the like, and because it overhangs the base assembly 280, it is important that the base be weighted (see sand 250 in FIG. 12) to prevent the display stand assembly 650 from tipping over.

Although rods 654 are depicted in FIG. 22 as being single continuous rods, they alternatively may each be first and second shorter rods which are screwed together, as described in previous embodiments. This allows the assembly (650), when completely disassembled, to be packed in shorter or smaller boxes for storage, display and transporting. Fixed shelves (see for example 562) may not be needed to tie the rods together if the assembly 650 is otherwise short enough and structurally stable. Adjustable shelves 670, 672, 674, 676 are slid along the (respective three of the five) rods 654 and squeeze clamps are positioned on the rods to support the shelves at the desired positions, similar to other embodiments disclosed herein.

Where the adjustable display and storage tower assembly is not too tall and does not have any weight supporting overhanging structures, a weighted base assembly (280) is probably not needed. However, structure is still needed to tie the lower ends of the rods together and hold them in spaced relation and to provide a suitable support for resting the assembly on a support surface. Shorter assemblies would usually be placed by the user on a table or desk top instead of the floor to raise it up so it is physically and visually more accessible to the user. Thus, the base assemblies used for the shorter assemblies should be attractive, since they will be closer to eye level than a tall floor mounted embodiment. They should also have smooth lower surfaces to minimize any marring or scratching of its table or desk top support surface.

An example of a shorter assembly is shown in FIGS. 23 and 36 as a three-rod table top storage and display assembly generally at 700. A variation of the three-rod assembly is shown generally at 702 in FIG. 36, and the difference between assemblies 700 and 702 will be discussed later. The three rods 704, 706, 708 can each be constructed as single unitary rods extending from the head assembly shown generally at 712 to the base assembly shown generally at 716. Alternatively, each of the rods 704, 706, 708 can be formed as two (or more) short rods or rod portions which releasably screw together. This provides for a shorter or smaller storage box (102) as previously discussed.

An example of the use of rod portions is best shown in the exploded perspective view of FIG. 23. As shown therein, rod 704 is formed by rods or rod portions 712, 714, rod 706 by rod portions 718, 720, and rod 708 by rod portions 722, 724. The top rod portions 714, 718, 722 have top threaded male ends 732, 734, 736, respectively, and bottom threaded female ends 738, 740, 742, respectively. And the bottom rod portions 712, 720, 724 have top threaded male ends 744, 746, 748, respectively, and bottom threaded male ends 750, 752, 754, respectively. The male ends can be constructed as elongated threaded sleeves which thread part way into a corresponding rod end. An example of one of the sleeves in isolation is shown at the top right portion of FIG. 23 at 746 and also at 162 in FIG. 2. Thus, the top threaded male ends 744, 746, 748 thread into the bottom threaded female ends 738, 740, 742, respectively, (or vice versa) to form the three rods 704, 706, 708.

The top assembly 712 includes a trapezoidal flat plate 760 having three holes 764, 766, 768, as illustrated in FIG. 23. The male threaded ends 732, 734, 736 are passed up through holes 764, 766, 768, respectively. And balls 774, 776, 778, as shown in FIG. 36, having threaded openings are screwed onto the exposed rod ends 732, 734, 736, respectively, as can be understood by consulting FIG. 11. This releasably secures the plate 760 to the tops of rods 704, 706 and 708.

The base assembly 716 is a mirror image construction of the top assembly 712. It similarly includes a trapezoidal plate 790 having through-holes 794, 796, 798. The bottom threaded male ends 750, 752 and 754 are passed down through the holes 794, 796, 798, respectively, and three balls 804, 806, 808 are threaded thereon.

Before both the top and bottom assembles 712 and 716 are secured to the rod ends as described above, the adjustable shelves 820, 824 are slid into place. on the rods, as previously described for other embodiments, with rod 706 passing through shelf holes 828, 830, rod 704 disposed in side holes or indents 834, 836 and rod 708 in side holes or indents 840, 842. The shelves 820, 824 are held at the desired heights on the rods 704, 706, 708 as desired by the user by positioning and securing squeeze clamps, such as those shown by reference numerals 850, 852, on the rods.

The assembly 700 is provided (sold) to the user completely disassembled and packed in a small box (102). The squeeze clamps 850, 852, when removed from the box are positioned on the rods (e.g. 704) as illustrated in FIGS. 24 and 25. Each of the clamps (850) is formed from a single wire strand having a central generally circular portion 860 and opposing legs or wings 864, 866. When the wings 864, 866 are squeezed towards one another by the user 870 as shown by arrows 872, 874 in FIG. 24, the central portion 860 is opened up so that it can then be fitted onto the end of rod 704. This is shown by arrow 878 in FIG. 24. The clamp 850 is then slid along the rod 704 until it is at the desired location. The user 870 then releases the wings 864, 866, which by spring action of the wire strand expand or move away from each other as shown by the arrows 884, 886 in FIG. 25. This causes the central portion 860 to contract onto the rod 704. When the user (870) wants to reposition the shelf 820 or the clamp 850, he simply squeezes the wings 864, 866 together thereby expanding the central portion 860, and slides the clamp to the new position on the rod 704.

Although the squeeze clamp (850) is the preferred method of holding the shelves at the desired height on the rods, alternative holder methods are shown in FIGS. 26–29. FIG. 26 shows an elastomeric ring 890. Ring 890 can be slid onto the rod 704 with a fit such that it can be push-slid by the user to another position on the rod and when released grips the rod with sufficient force to hold the shelf and its contents without sliding down the rod(s).

FIGS. 27 and 28 show holders which unlike clamp 850 and ring 890 do not allow for the positioning of the shelf anywhere along the continuum of the length of the rod. Rather, incremental positioning at a plurality of predetermined spaced positions is provided.

FIG. 27 shows these positions determined by spaced holes 894 in the rod 704. A thin peg 896 is inserted into the hole 894 at the desired location to provide the support surface for the adjustable shelf 820.

In contrast, the positions are determined by spaced slots or grooves 900 in the rod 704, according to the embodiment of FIG. 28, into which the adjacent edge of the shelf 820 is fit. An elastomeric C-ring 902 is pressed onto the rod 704 directly beneath the desired groove 900, to provide a holding support for the shelf 820. Instead of grooves, reference numeral 900 can point to predetermined shelf position marks on the rod 704.

A less desirable holder is shown in FIG. 29. Adhesive tape 906 is wound off of a roll 908 on the rod 704, and the shelf 820 rests on top of the wound tape 906.

A preferred way of securing the rod portions 722, 724 together to form a long rod 708 is to use the previously-described threaded cylinder 742. Alternative methods are shown in FIGS. 30–33. Each of the alternative methods allows the rod portions 722, 724 to be subsequently separated or disassembled if needed. Also, advantageously none of them requires any special tools for attaching or separating the rod portions.

FIG. 30 shows a threaded male and 912 permanently affixed to rod portion 722 which threads into threaded opening 914 in rod portion 724.

FIG. 31 shows a post 920 on the end of rod portion 722 and an elastomeric ring 922 secured on the post. The post 920 is then slid into the opening 926 in the rod portion 724 until the ring 922 snap fits into a groove 928 in the opening. To release the rod portions 722 and 724, they are pulled apart until the ring 922 pulls out of the groove 924.

A post 930 is also provided on the rod portion 722. It fits up into the bottom opening in the rod portion 724. The straight leg 932 of the cotter pin 934 is passed through the aligned holes 938, 940 of the rod portion 724 and the post 930, until the curved central portion 942 of the opposite leg 944 of the cotter pin snaps onto the rod portion 724. The rod portions 722, 724 are thereby secured together. To disconnect them the cotter pin 934 is pulled away from the rod portions 722, 724 and out of the holes 938, 940 and the rod portions 722, 724 pulled apart.

Another alternative releasable securement means is illustrated in FIG. 33. It shows rod portion 722 being provided with an end opening 950, large enough to receive therein the end 954 of rod portion 724. A cylindrical button 956 extends out an opening in the wall of rod portion 724. The button 956 is biased out the hole by a resilient member 960 to which it is mounted inside of the rod portion 724. When the rod portion 724 is pushed into the end opening 950, the button 956 is pushed into the rod portion against the outward bias of the resilient member 958. With the rod portion 724 inserted a distance into the end opening 950 and with the button 956 aligned with the lateral hole 960 in the wall of the rod portion 722, the resilient member 958 biases or pushes the button into the lateral hole so that it extends out a short distance. The rod portions 722, 724 are thereby secured together in linear alignment. To release them, the button 956 is pushed into the hole 960 against the bias of resilient member 958 and the rod portions 722, 724 are pulled apart.

The table top assembly 700 is shown assembled in FIG. 36. A variation of assembly 700 is shown in front elevational view in FIG. 37 at 702. For assembly 700, no fixed shelf is provided at the juncture of the rod portions. Similar to display stand 650, the assembly 700 is likely not so tall that a structural fixed shelf is required. However, one can be provided, if desired, as shown in FIG. 37 for assembly 702 by fixed shelf 964, similar to fixed shelf 116 which is illustrated in FIG. 7.

Where a large weighted base such as 104 is used (instead of the flat plate 790 of the base assembly 712, for example), other means, aside from threaded means, for releasably securing the bottom ends of the rods to the base assembly will now be described. The threaded means (150) can best be understood from FIG. 12. Alternative means are illustrated in FIGS. 34 and 35.

FIG. 34 shows the base assembly 104 having an opening 970 having a resilient liner or sleeve 972. When the end of the rod (106) is pushed into the opening 970, the resilient liner 972 grips it. The grip is not so tight, however, that the rod cannot later be pulled out of the opening 970 if desired.

For the embodiment of FIG. 35 the liner 976 of the hole 978 need not provide a resilient gripping action. Rather, the (primary) securing action is provided by a hook 982 secured at one end of the base assembly 104. With the end of the rod (106) in the hole 978, the hook 982 is snapped into securement on the groove 984 in the rod. For disassembly the hook 982 is simply pulled out of the groove 984, and the rod pulled out of the opening 978.

Table top assembly as shown generally at 1000 in FIG. 38 is similar to assembly 700 except that it is a five rod, instead of a three rod, structure. This allows for a side-to-side staggered arrangement of the adjustable shelves, as can be understood from FIG. 38. Referring thereto, it is seen that assembly 1000 includes rods 1004, 1006, 1008, 1010,1012, top plate 1016, top balls 1020,1022,1024, 1026, 1028, bottom plate 1032, bottom balls 1036, 1038, 1040, 1042, 1044, and adjustable shelves 1048, 1050, 1052, 1054. Squeeze clamps as previously described with reference to FIGS. 24 and 25 are also provided.

The five-rod table top assembly 1060 shown in front elevational view in FIG. 39 is a variation of assembly 1000. A fixed shelf 1062 is secured at the junctions of the rod portions for each of the rods, similar to shelf 312, for example. With the inclusion of the fixed shelf 1062, the adjustable shelves 1052, 1054 are shown at different heights on the rods in assembly 1060 than in assembly 1000. Different numbers and different positionings of the adjustable shelves allow for different storage and display arrangements as desired by the user.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A storage and display assembly, comprising:
  a base assembly;
  a plurality of rods removably attachable upright to said base assembly;
  an adjustable shelf having a through-opening, one of said rods passing through said opening such that said shelf can slide up and down said rod to a desired location along at least some of said rods; and
  a holder attachable to at least one of said rods at a location corresponding to the desired location to thereby hold said shelf at the desired location;
  wherein said opening is proximate to but spaced from one edge of said shelf, and said shelf includes an indent on another edge of said shelf and in which another of said rods slides for positioning said shelf relative to said rods.

2. The assembly of claim 1 wherein said shelf includes another indent on a third edge of said shelf opposite to said another edge and in which a third of said rods slides for positioning said shelf relative to said rods.

3. A storage and display assembly, comprising:
  a base assembly;
  a plurality of rods removably attachable upright to said base assembly;
  an adjustable shelf having a through-opening, one of said rods passing through said opening such that said shelf can slide up and down said rod to a desired location along at least some of said rods; and
  a holder attachable to at least one of said rods at a location corresponding to the desired location to thereby hold said shelf at the desired location;
  wherein said rods are removably attachable to said base assembly by resilient gripping means.

4. The assembly of claim 3 wherein said resilient gripping means comprises an elastomeric grommet.

5. A storage and display assembly, comprising:
  a base assembly;
  a plurality of rods removably attachable upright to said base assembly;
  an adjustable shelf having a through-opening, one of said rods passing through said opening such that said shelf can slide up and down said rod to a desired location along at least some of said rods; and
  a holder attachable to at least one of said rods at a location corresponding to the desired location to thereby hold said shelf at the desired location;
  wherein said base assembly has openings for receiving therein a lower end of a respective said rod; and
  securing means for releasably securing said lower end in said opening, said securing means comprising a hook.

6. A storage and display assembly, comprising:
  a base assembly;
  a plurality of rods removably attachable upright to said base assembly;

an adjustable shelf having a through-opening, one of said rods passing through said opening such that said shelf can slide up and down said rod to a desired location along at least some of said rods; and a holder attachable to at least one of said rods at a location corresponding to the desired location to thereby hold said shelf at the desired location;

wherein said holder comprises a squeeze clamp which when squeezed is slidable along a respective one of said rods and when released is secured to said rod at the corresponding location.

7. The assembly of claim 6 wherein said squeeze clamp is a wire member having an encircling portion encircling said rod by sliding onto an end thereof and a pair of opposing squeeze arms extending out from said encircling portion.

8. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods; and a holder attachable to at least one of said rods at a location corresponding to the desired location to thereby hold said shelf at the desired location;

wherein said holder comprises tape wrapped around one of said rods.

9. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods; and a holder attachable to at least one of said rods at a location corresponding to the desired location to thereby hold said shelf at the desired location;

wherein said holder comprises an elastomeric ring around one of said rods.

10. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods; and a holder attachable to at least one of said rods at a location corresponding to the desired location to thereby hold said shelf at the desired location;

wherein said shelf includes a plate having an article abutment rear wall and opposing article support side walls.

11. The assembly of claim 10 wherein said base assembly comprises a weighted base unit.

12. The assembly of claim 10 wherein said base assembly comprises a plate, and securing members at an underneath side of said plate for securing said plate in place relative to said rods, said securing members comprising balls, and said balls and said rods threadably mount to one another.

13. The assembly of claim 10 wherein said base assembly includes a plate having through-openings and a plurality of feet, and lower ends of said rods pass through respective said through-openings and thread relative to respective said feet, wherein said feet each comprise a spherical element.

14. The assembly of claim 10 wherein said opening is proximate to but spaced from one edge of said shelf, and said shelf includes an indent on another edge of said shelf and in which another of said rods slides for positioning said shelf relative to said rods.

15. The assembly of claim 14 wherein said shelf includes another indent on a third edge of said shelf opposite to said another edge and in which a third of said rods slides for positioning said shelf relative to said rods.

16. The assembly of claim 10 wherein said holder comprises a squeeze clamp which when squeezed is slidable along a respective one of said rods and when released is secured to said rod at the corresponding location.

17. The assembly of claim 16 wherein said squeeze clamp is a wire member having an encircling portion encircling said rod by sliding onto an end thereof and a pair of opposing squeeze arms extending out from said encircling portion.

18. The assembly of claim 10 wherein said holder comprises an elastomeric ring around one of said rods.

19. The assembly of claim 10 wherein the desired location is selected from a continuum of locations along said rods.

20. The assembly of claim 10 wherein the desired location is selected from a plurality of predetermined incremental locations along said rods.

21. The assembly of claims 20 wherein said rod includes a plurality of longitudinally spaced positioning holes, and said holder includes a pin insertable in one of said holes at the corresponding location.

22. The assembly of claim 20 wherein said holder includes spaced recesses on said rod at the incremental locations.

23. The assembly of claim 10 further comprising a plate at tops of said rods which ties at least some of said rods together.

24. The assembly of claim 23 wherein said plate has an opening corresponding to one of said rods.

25. The assembly of claim 24 further comprising a member at a top of said one of said rods which passes through said plate opening, and an attachment unit which attaches to said member and is positioned at a top side of said plate.

26. The assembly of claim 25 wherein said attachment unit comprises a ball.

27. The assembly of claim 25 wherein said attachment unit comprises a threaded member.

28. The assembly of claim 10 wherein each of said rods includes at least two rod portions releasably securable one on top of another.

29. The assembly of claim 10 further comprising said plurality of rods comprising first, second, third, fourth and fifth rods, said shelf defines a first adjustable shelf which slides on said first, second and third rods, and a second adjustable shelf which slides on said third, fourth and fifth rods to a desired location.

30. The assembly of claim 29 wherein when said first and second shelves are at their respective desired locations, said first and second shelves are offset vertically one from another.

31. The assembly of claim 30 further comprising a third adjustable shelf which slides on said first, second and third rods to a desired location, wherein the desired location of said third adjustable shelf is spaced above that of said first adjustable shelf with said second adjustable shelf disposed in a plane between said first and third adjustable shelves.

32. The assembly of claim 10 further comprising a support plate releasably secured to tops of said rods, and said support plate having length and width dimensions at least one of which is greater than that of said base assembly.

33. The assembly of claim 10 further comprising an upwardly disposed lamp secured at the tops of said rods.

34. The assembly of claim 33 further comprising a lamp support plate at the tops of said rods, said lamp support plate having an opening for releasably securing said lamp thereto.

35. The assembly of claim 34 further comprising fasteners on top of said lamp support plate for securing said rods to said lamp support plate.

36. The assembly of claim 35 wherein said fasteners each comprise a ball which releasably secures to a respective said rod with a threaded securement.

37. The assembly of claim 10 further comprising said base assembly having a plurality of openings, one for each of said rods, and securing means for releasably securing at least one of said rods in a respective one of said base assembly openings.

38. The assembly of claim 37 wherein said securing means comprises a threaded securement.

39. The assembly of claim 37 wherein said securing means comprises a resilient gripping sleeve in said base assembly opening.

40. The assembly of claim 37 wherein said securing means comprises a hook securement.

41. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods; and a holder attachable to at least one of said rods at a location corresponding to the desired location to thereby hold said shelf at the desired location;

wherein said support plate has a peripheral upstanding lip.

42. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods;

a holder attachable to at least one of said rods at a location corresponding to the desired location to thereby hold said shelf at the desired location; and an upwardly disposed lamp secured at the tops of said rods.

43. The assembly of claim 42 further comprising a lamp support plate at the tops of said rods, said lamp support plate having an opening for releasably securing said lamp thereto.

44. The assembly of claim 43 further comprising fasteners on top of said lamp support plate for securing said rods to said lamp support plate.

45. The assembly of claim 44 wherein said fasteners each comprise a ball which releasably secures to a respective said rod with a threaded securement.

46. The assembly of claim 42 wherein said base assembly comprises a weighted base unit.

47. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods;

a holder attachable to at least one of said rods at a location corresponding to the desired location to thereby hold said shelf at the desired location; and said base assembly having a plurality of openings, one for each of said rods, and securing means for releasably securing at least one of said rods in a respective one of said base assembly openings;

wherein said securing means comprises a hook securement.

48. A storage and display assembly, comprising:

a base assembly;

a first set of rods releasably mountable into upright, spaced securement on said base assembly;

a second set of rods securable onto tops of respective ones of said rods of said first set and extending vertically up therefrom;

a fixed shelf held in level disposition at a juncture between said first and second sets of rods;

an adjustable shelf having at least one opening through which at least one of said rods passes such that said shelf is slidable along said rod; and a support assembly which supports in generally level disposition said shelf at a desired height on said rods of one of said sets;

wherein said adjustable shelf includes said opening being proximate to but spaced from a back edge of said shelf, a first side opening engaging a first side of said shelf and a second side opening engaging an opposite second side of said shelf.

49. The assembly of claim 48 wherein said support assembly includes support clips positionable by a user on said rods to support said shelf at the desired height.

50. A storage and display assembly, comprising:

a base assembly;

a first set of rods releasably mountable into upright, spaced securement on said base assembly;

a second set of rods securable onto tops of respective ones of said rods of said first set and extending vertically up therefrom;

a fixed shelf held in level disposition at a juncture between said first and second sets of rods;

an adjustable shelf having at least one opening through which at least one of said rods passes such that said shelf is slidable along said rod;

a support assembly which supports in generally level disposition said shelf at a desired height on said rods of one of said sets; and wherein said support assembly includes support clips positionable by a user on said rods to support said shelf at the desired height.

51. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods; and a holder attachable to at least one of said rods at a location corresponding to the desired location to thereby hold said shelf at the desired location;

wherein said shelf includes a folded-over back edge through which said through-opening passes.

52. The assembly of claim 51 wherein said flat plate has a pair of upturned side lips.

53. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods;

a holder attachable to at least one of said rods at a location corresponding to the desired location to thereby hold said shelf at the desired location; and wherein said base assembly includes: a weighted housing enclosure; a plurality of connector members, one for each of said rods, extending up from said weighted housing enclosure; and a plate disposed above a top surface of said weighted housing enclosure and having a plurality of openings in which respective ones of said connector members are disposed.

54. The assembly of claim 53 wherein said openings are disposed proximate edges of said plate.

55. The assembly of claim 53 wherein each of said connector members includes a threaded connector member, a top nut threaded onto said threaded connector member and securing said threaded connector member relative to a top surface of said weighted housing enclosure and a bottom nut threaded onto said threaded connector member and securing said threaded connector member relative to a bottom surface of said threaded housing enclosure.

56. The assembly of claim 55 wherein said top nuts are positioned between said top plate and said top surface.

57. The assembly of claim 55 wherein said housing enclosure includes a plurality of vertical sleeves, each receiving a respective said connector member therein.

58. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods;

a holder attachable to at least one of said rods at a location corresponding to the desired location to thereby hold said shelf at the desired location; and wherein said base assembly includes: a housing enclosure having top and bottom plates spaced from one another and heavy material at least substantially filling said housing enclosure such that said base assembly comprises a weighted base assembly; a plurality of vertical sleeves extending between said top and bottom plates and through said housing enclosure; and a plurality of connector members, each disposed in a respective said sleeve and each secured to a respective said rod.

59. The assembly of claim 58 wherein said connector members comprise threaded connector members with threaded nuts securing said threaded connector members to said top and bottom plates.

60. A storage and display assembly, comprising:

a base assembly;

a first set of rods releasably mountable into upright, spaced securement on said base assembly;

a second set of rods threadable onto tops of respective ones of said rods of said first set and extending vertically up therefrom; and a fixed shelf held in level disposition at a juncture between said first and second sets of rods;

wherein said rods of said first set have ledges at tops thereof which support said fixed shelf.

61. The assembly of claim 60 wherein said rods of said first set are threadable into securement on said base assembly, said base assembly being a single continuous weighted unit which has a footprint larger than that of said fixed shelf.

62. The assembly of claim 60 further comprising a top plate securable at tops of said rods of said second set.

63. The assembly of claim 62 wherein said top plate is securable by threaded means to said rods.

64. The assembly of claim 62 further comprising said top plate having openings, and securement members threadably attachable to respective said rods of said second set via said openings.

65. The assembly of claim 64 wherein said securement members have threaded openings.

66. The assembly of claim 65 wherein said securement members comprise balls.

67. The assembly of claim 60 wherein said through-opening is proximate to but spaced inwardly from an edge of said shelf.

68. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods; and a holder attachable to at least one of said rods at a location corresponding to the desired location to thereby hold said shelf at the desired location;

wherein said plurality of rods comprise first, second, third, fourth and fifth rods, said shelf defines a first adjustable shelf which slides on said first, second and third rods, but not said fourth and fifth rods; and a second adjustable shelf which slides on said third, fourth and fifth rods, but not said first and second rods, to a desired location.

69. The assembly of claim 68 wherein when said first and second shelves are at their respective desired locations, said first and second shelves are offset vertically one from another.

70. The assembly of claim 69 further comprising a third adjustable shelf which slides on said first, second and third rods to a desired location, wherein the desired location of said third adjustable shelf is spaced above that of said first adjustable shelf with said second adjustable shelf disposed in a plane between said first and third adjustable shelves.

71. The assembly of claim 68 wherein said through-opening is proximate to but spaced inwardly from an edge of said shelf.

72. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods;

a holder attachable to at least one of said rods at a location corresponding to the desired location to thereby hold said shelf at the desired location; and an article-display support plate secured on top of said rods, said support plate having length and width dimensions greater than those of said base assembly;

wherein said base assembly comprises a weighted base assembly unit which has a footprint larger than that of said shelf.

73. The assembly of claim 72 further comprising said plurality of rods comprising first, second, third, fourth and fifth rods, said shelf defines a first adjustable shelf which slides on said first, second and third rods, and a second adjustable shelf which slides on said third, fourth and fifth rods to a desired location.

74. The assembly of claim 73 wherein when said first and second shelves are at their respective desired locations, said first and second shelves are offset vertically one from another.

75. The assembly of claim 74 further comprising a third adjustable shelf which slides on said first, second and third rods to a desired location, wherein the desired location of said third adjustable shelf is spaced above that of said first adjustable shelf with said second adjustable shelf disposed in a plane between said first and third adjustable shelves.

76. The assembly of claim 72 wherein said support plate has a peripheral upstanding lip.

77. The assembly of claim 72 further comprising screws which secure said support plate to tops of said rods.

78. The assembly of claim 72 wherein said through-opening is proximate to but spaced inwardly from an edge of said shelf.

79. A storage and display assembly, comprising:

a base assembly;

a plurality of rods removably attachable upright to said base assembly;

an adjustable shelf having a through-opening, one of said rods passing through said opening such that said shelf can slide up and down said rod to a desired location along at least some of said rods;

a holder attachable to at least one of said rods at a location corresponding to the desired location to thereby hold said shelf at the desired location;

said base assembly includes a bottom plate having plate through-openings and a plurality of feet, and lower ends of said rods pass through respective said plate through openings and thread relative to respective said feet, said feet each comprise a spherical element;

a top plate at tops of said rods and having holes corresponding to said rods; and balls positionable on top of said plate and threadable relative to said rods to secure said plate and said rods together.

80. The assembly of claim 79 wherein both of said top and bottom plates are shaped as trapezoids.

81. The assembly of claim 80 wherein said shelf has a rectangular shape.

82. The assembly of claim 79 wherein said through-opening is centered at a rear edge of said shelf.

83. The assembly of claim 79 wherein said plurality of rods consists of three rods arranged as an isosceles triangle.

84. The assembly of claim 79 further comprising said plurality of rods comprising first, second, third, fourth and fifth rods, said shelf defines a first adjustable shelf which slides on said first, second and third rods, and a second adjustable shelf which slides on said third, fourth and fifth rods to a desired location.

85. The assembly of claim 84 wherein when said first and second shelves are at their respective desired locations, said first and second shelves are offset vertically one from another.

86. The assembly of claim 85 further comprising a third adjustable shelf which slides on said first, second and third rods to a desired location, wherein the desired location of said third adjustable shelf is spaced above that of said first adjustable shelf with said second adjustable shelf disposed in a plane between said first and third adjustable shelves.

87. The assembly of claim 79 wherein said through-opening is proximate to but spaced inwardly from an edge of said shelf.

* * * * *